United States Patent
Funabiki et al.

(10) Patent No.: US 7,849,218 B2
(45) Date of Patent: Dec. 7, 2010

(54) HDMI LOGICAL ADDRESS ASSIGNMENT METHOD FOR USE IN WIRELESS COMMUNICATION SYSTEM

(75) Inventors: Makoto Funabiki, Osaka (JP); Akihiro Tatsuta, Kyoto (JP); Hiroshi Ohue, Osaka (JP)

(73) Assignee: Panasonic Corporation, Osaka (JP)

( * ) Notice: Subject to any disclaimer, the term of this patent is extended or adjusted under 35 U.S.C. 154(b) by 188 days.

(21) Appl. No.: 12/301,523

(22) PCT Filed: May 21, 2007

(86) PCT No.: PCT/JP2007/060381

§ 371 (c)(1),
(2), (4) Date: Nov. 19, 2008

(87) PCT Pub. No.: WO2007/136038

PCT Pub. Date: Nov. 29, 2007

(65) Prior Publication Data

US 2009/0210539 A1    Aug. 20, 2009

(30) Foreign Application Priority Data

May 19, 2006    (JP)    ............... 2006-140126

(51) Int. Cl.
*G06F 15/16*    (2006.01)
(52) U.S. Cl. .................. 709/245; 709/228; 709/223; 370/449; 370/431
(58) Field of Classification Search ......... 709/227–228, 709/220–223, 245; 370/449, 431, 329, 468
See application file for complete search history.

(56) References Cited

U.S. PATENT DOCUMENTS

| | | | |
|---|---|---|---|
| 7,324,738 B2 | 1/2008 | Sugimoto | |
| 7,378,984 B2 | 5/2008 | Suzuki et al. | |
| 2004/0198469 A1 | 10/2004 | Kurokawa | |
| 2005/0053159 A1 | 3/2005 | Sugimoto | |
| 2006/0143679 A1 | 6/2006 | Yamada et al. | |
| 2006/0209892 A1* | 9/2006 | MacMullan et al. | 370/468 |
| 2006/0212911 A1* | 9/2006 | MacMullan et al. | 725/81 |

(Continued)

FOREIGN PATENT DOCUMENTS

JP    2004-208290    7/2004

(Continued)

OTHER PUBLICATIONS

International Search Report issued Jun. 19, 2007 in the International (PCT) Application No. PCT/JP2007/060381.

(Continued)

*Primary Examiner*—Salad Abdullahi
(74) *Attorney, Agent, or Firm*—Wenderoth, Lind & Ponack, L.L.P.

(57) ABSTRACT

A CEC controller of a wireless node device determines a destination logical address of a polling message received through a wired interface circuit based on an address list table in an address list memory when the polling message is received from a wired interface circuit, and transmits an ACK for the received polling message through the wired interface circuit in the case that the destination logical address of the polling message is a logical address of a node device connected over a wireless interval.

34 Claims, 13 Drawing Sheets

U.S. PATENT DOCUMENTS

2008/0276293 A1* 11/2008 Perry et al. ............... 725/118

FOREIGN PATENT DOCUMENTS

| JP | 2004-274608 | 9/2004 |
| JP | 2004-312069 | 11/2004 |
| JP | 2005-33302 | 2/2005 |
| JP | 2005-102186 | 4/2005 |
| WO | 2005/006740 | 1/2005 |

OTHER PUBLICATIONS

High-Definition Multimedia Interface Specification, Version 1.1, HDMI Licensing, LLC, California, USA, May 20, 2004.

High-Definition Multimedia Interface Specification, Version 1.2, HDMI Licensing, LLC, California, USA, Aug. 22, 2005.

* cited by examiner

| IDENTIFIER | LOGICAL ADDRESS | FLAG | PHYSICAL ADDRESS |
|---|---|---|---|
| 1 | A | 1 | 0. 0. 0. 0 |
| 2 | B | 1 | 1. 0. 0. 0 |
| 3 | C | 0 | 2. 0. 0. 0 |
| ... | ... | ... | ... |

ADDRESS LIST TABLE

HDMI LOGICAL ADDRESS ASSIGNMENT METHOD FOR USE IN WIRELESS COMMUNICATION SYSTEM

TECHNICAL FIELD

The present invention relates to a logical address assignment method by which, even when devices conforming to HDMI standard are connected over wireless intervals, logical addresses of HDMI can be assigned to the devices, and relates to a wireless communication device that performs such a logical address assignment.

BACKGROUND ART

According to some of the prior art methods of logical address assignment of HDMI (High-Definition Multimedia Interface), logical addresses are assigned via wired connections. The standard of HDMI is established in Non-Patent Document 1. According to HDMI, the logical addresses are used for identifying respective devices, thus transmitting control signals among the devices and enabling the devices to control each other (e.g., See Patent Document 1).

A logical address assignment method will be described which is used in the case that a plurality of devices conforming to HDMI standard are connected by wire using HDMI cables. Logical addresses represents 16 values ranging from 0 to F in hexadecimal, and each is associated with a type of a device. For example, when the device is a TV, it is represented by 0; when the device is a DVD player, it is represented by 4 or 8; and when the device is a Set Top Box (STB), it is represented by 3, 6, or 7.

At first, a physical address 0.0.0.0 is set in advance for a Sink device (e.g., a TV, projector, etc.). When the Sink device has a plurality of HDMI input ports, a physical address for a device to be connected to each input port is stored in a physical address carrying field of EDID (Extended Display Identification Data) which is provided in association with each port. The stored physical address is configured based on the physical address of the device itself, and a port number. For example, 1.0.0.0 is stored in a physical address carrying field of EDID associated with an input port with port number 1 of the Sink device, and 2.0.0.0 is stored in a physical address carrying field of EDID associated with an input port with port number 2. Once s Source device (e.g., a DVD player, STB, etc.) is connected to an input port of the Sink device, the Source device detects an HPD (Hot Plug Detect) signal indicating the connection. When the Source device detects the HPD signal, the Source device reads a physical address carrying field of EDID of the Sink device using DDC (Display Data Channel), and sets the read physical address as a physical address of the Source device itself. After setting the physical address, the Source device starts assigning a logical address to the Source device itself.

The Source device firstly selects one logical address from logical addresses associated with the type of the Source device itself. The Source device outputs a polling message destined for the selected logical address onto a CEC (Consumer Electronics Control) bus. Each device receiving the polling message returns an ACK when the destination logical address of the polling message is a logical address of the device itself. When any ACK for the polling message is not returned on the CEC bus, the Source device determines to use the selected logical address. On the other hand, when an ACK for the polling message is returned, the Source device determines that the destination logical address of the polling message has been already assigned to another device, and thus selects another logical address associated with the type of the Source device itself. The Source device outputs a polling message destined for the selected logical address onto the CEC bus, and when any ACK is not returned, the Source device determines to use the selected logical address. When an ACK is returned again, the Source device selects a different logical address and outputs a polling message in a similar manner.

Patent Document 1: Japanese Patent laid-open Publication No. 2004-208290.

Non-Patent Document 1: High-Definition Multimedia Interface Specification, Version 1.1, HDMI Licensing, LLC, California in U.S.A., May 20, 2004.

DISCLOSURE OF INVENTION

Problems To Be Solved by the Invention

However, under circumstances where devices are connected over wireless intervals, even when an ACK for a polling message transmitted from a certain device is returned by a device having a destination logical address of the polling message, the device that transmitted the polling message cannot receive the ACK within a predetermined period of time. Hence, since the device that transmitted the polling message has not received any ACK, it determines that the destination logical address of the polling message has not been used, and thus uses the logical address as an address of the device itself. As such, under circumstances where wireless intervals are interposed between devices, there is a problem that logical addresses cannot be assigned without conflict.

It is an object of the present invention to solve the above-described problems, and to provide a logical address assignment method by which, even when devices conforming to HDMI standard are connected over wireless intervals, logical addresses can be assigned to the devices without conflict, and to provide a wireless communication device that performs such a logical address assignment.

Means for Solving the Problem

According to the first aspect of the present invention, a logical address assignment method is provided, for use in a wireless communication system that includes a plurality of node devices including at least two wireless communication devices and each transmitting and receiving CEC messages of HDMI, each of the at least two wireless communication devices is provided with a wired interface, a wireless interface, and address list storage means. The logical address assignment method includes steps of: by each of the wireless communication devices, storing logical addresses of node devices connected through the wired interface and logical addresses of node devices connected through the wireless interface, in the address list storage means; and by one of the at least two wireless communication devices, determining a destination logical address of a polling message received through the wired interface based on contents of the address list storage means when the polling message is received through the wired interface, and transmitting an ACK signal for the received polling message through the wired interface in the case that the destination logical address of the polling message is a logical address of a node device connected through the wireless interface.

In the logical address assignment method, the step of storing the logical addresses includes steps of, by one of the at least two wireless communication devices: adding a logical address of a node device newly connected to the wired interface, to the address list storage means; checking periodically connections of the node devices which are connected to the one wireless communication device through the wired interface and whose logical addresses are stored in the address list storage means; and deleting a logical address of a node device from the address list storage means, where said node device is determined, to be disconnected from the one wireless communication device, as a result of checking the connections.

Moreover, in the logical address assignment method, the step of checking periodically the connections includes checking the connections by polling messages.

Further, in the logical address assignment method, each of the address list storage means further stores flags each indicating whether or not each of the node devices corresponding to the logical addresses stored in the address list storage means is connected through the wired interface to the wireless communication device provided with the address list storage means.

Furthermore, in the logical address assignment method, each of the address list storage means further contains physical addresses of the node devices corresponding to the logical addresses stored in the address list storage means.

Moreover, in the logical address assignment method, the step of storing the logical addresses includes steps of, by one of the at least two wireless communication devices: referring to the physical addresses in the address list storage means when a node device connected through the wired interface has been disconnected, and determining that a lower node device connected in a lower layer than that of the disconnected node device has also been disconnected in the case that there is the lower node device; and deleting from the address list storage means, the logical address of each of the node devices which is determined to be disconnected from the one wireless communication device.

Further, in the logical address assignment method, the wireless communication system further includes address management means for managing wireless addresses for the respective node devices. The step of storing the logical addresses includes a step of obtaining wireless addresses from the address management means, where each of the wireless addresses is for each of the node devices connected to the wireless communication device through the wired interface, and storing each of the wireless addresses in the address list storage means in association with the logical address of the corresponding node device.

Furthermore, in the logical address assignment method, each of the wired interfaces includes a 5V signal line of HDMI. The step of storing the logical addresses includes steps of, by one of the at least two wireless communication devices: determining whether or not a node device has been disconnected from the one wireless communication device based on a voltage value of the 5V signal line, where said node device is connected to the one wireless communication device through the wired interface and whose logical address is stored in the address list storage means; and deleting from the address list storage means, the logical address of the node device determined to be disconnected from the one wireless communication device.

Moreover, the logical address assignment method further includes a step of: by one of the at least two wireless communication devices, receiving a specific message, and adding an originating logical address contained in the received message to the address list storage means of the one wireless communication device.

Further, in the logical address assignment method, the specific message is a Report Physical Address message.

Furthermore, the logical address assignment method further includes a step of: by one of the at least two wireless communication devices, receiving the Report Physical Address message, and adding an originating logical address and a physical address which are contained in the received message, to the address list storage means of the one wireless communication device, such that the originating logical address and the physical address are associated with each other.

Moreover, the logical address assignment method further includes steps of, by one of the at least two wireless communication devices: transmitting a list exchange message to the other wireless communication device through the wireless interface when the contents stored in the address list storage means are changed, where said list exchange message indicates changes in the address list storage means; and adding or deleting a logical address of a node device connected through the wireless interface according to a list exchange message indicating changes in address list storage means of the other wireless communication device, when the list exchange message indicating the changes is received from the other wireless communication device.

Further, in the logical address assignment method, the list exchange message contains at least a portion of the contents of the address list storage means.

Furthermore, in the logical address assignment method, each of the wireless communication devices transmits the list exchange message each time the address list storage means of the wireless communication device is changed.

Moreover, in the logical address assignment method, the list exchange message contains at least the logical address that is newly added to or deleted from the address list storage means, and a bit indicating the addition or deletion of the logical address.

Further, in the logical address assignment method, the list exchange message contains information on all the node devices stored in the address list storage means.

Furthermore, the logical address assignment method further includes a step of selecting a logical address of a wireless communication device itself from among logical addresses not present in the address list storage means of the wireless communication device.

According to the second aspect of the present invention, a wireless communication device for assigning logical addresses is provided, for use in a wireless communication system that includes a plurality of node devices including at least two wireless communication devices and each transmitting and receiving CEC messages of HDMI. Each of the wireless communication devices is provided with: a wired interface; a wireless interface; address list storage means for storing logical addresses of node devices connected through the wired interface and logical addresses of node devices connected through the wireless interface; and control means for controlling transmission and reception through the wired interface and the wireless interface based on contents of the address list storage means. When one of the at least two wireless communication devices receives a polling message from the wired interface, the control means determines a destination logical address of the polling message based on contents of the address list storage means, and transmits an ACK signal for the received polling message through the wired interface in the case that the destination logical address of the polling message is a logical address of a node device connected through the wireless interface.

In one of the at least two wireless communication devices, the control means: adds a logical address of a node device newly connected to the wired interface, to the address list storage means; checks periodically connections of the node devices which are connected to the wireless communication device through the wired interface and whose logical addresses are stored in the address list storage means; and deletes a logical address of a node device from the address list storage means, where said node device is determined to be disconnected from the wireless communication device, as a result of checking the connections.

Moreover, in the wireless communication device, checking periodically the connections includes checking the connections by polling messages.

Further, in the wireless communication device, each of the address list storage means further stores flags each indicating whether or not each of the node devices corresponding to the logical addresses stored in the address list storage means is connected through the wired interface to the wireless communication device provided with the address list storage means.

Furthermore, in the wireless communication device, each of the address list storage means further contains physical addresses of the node devices corresponding to the logical addresses stored in the address list storage means.

Moreover, in one of the at least two wireless communication devices, the control means: refers to the physical addresses in the address list storage means when a node device connected through the wired interface has been disconnected, and determines that a lower node device connected in a lower layer than that of the disconnected node device has also been disconnected in the case that there is the lower node device; and deletes from the address list storage means, the logical address of each of the node devices which is determined to be disconnected from the wireless communication device.

Further, the wireless communication system further includes address management means for managing wireless addresses for the respective node devices. The control means obtains wireless addresses from the address management means, where each of the wireless addresses is for each of the node devices connected to the wireless communication device through the wired interface, and stores each of the wireless addresses in the address list storage means in association with the logical address of the corresponding node device.

Furthermore, in the wireless communication device, the wired interface includes a 5V signal line of HDMI. In one of the at least two wireless communication devices, the control means: determines whether or not a node device has been disconnected from the wireless communication device based on a voltage value of the 5V signal line, where said node device is connected to the wireless communication device through the wired interface and whose logical address is stored in the address list storage means; and deletes from the address list storage means, the logical address of the node device determined to be disconnected from the wireless communication device.

Moreover, when one of the at least two wireless communication devices receives a specific message, the control means of the wireless communication device adds an originating logical address contained in the received message to the address list storage means of the wireless communication device.

Further, in the wireless communication device, the specific message is a Report Physical Address message.

Furthermore, when one of the at least two wireless communication devices receives the Report Physical Address message, the control means of the wireless communication device adds an originating logical address and a physical address which are contained in the received message, to the address list storage means of the wireless communication device, such that the originating logical address and the physical address are associated with each other.

Moreover, in one of the at least two wireless communication devices: when the contents stored in the address list storage means are changed, the control means transmits a list exchange message to the other wireless communication device through the wireless interface, the list exchange message indicating changes in the address list storage means. When a list exchange message indicating changes in address list storage means of the other wireless communication device is received from the other wireless communication device, the control means adds or deletes a logical address of a node device connected through the wireless interface according to the changes indicated in the received list exchange message.

Further, in the wireless communication device, the list exchange message contains at least a portion of the contents of the address list storage means.

Furthermore, in the wireless communication device, each of the wireless communication devices transmits the list exchange message each time the address list storage means of the wireless communication device is changed.

Moreover, in the wireless communication device, the list exchange message contains at least the logical address that is newly added to or deleted from the address list storage means, and a bit indicating the addition or deletion of the logical address.

Further, in the wireless communication device, the list exchange message contains information on all the node devices stored in the address list storage means.

Furthermore, in one of the at least two wireless communication devices, the control means selects a logical address of the wireless communication device itself from among logical addresses not present in the address list storage means of the wireless communication device.

Effects of the Invention

Hence, according to the logical address assignment method and wireless communication device according to the present invention, even when devices conforming to HDMI standard are connected to each other over the air, it is possible to assign logical addresses to the respective devices without conflict, and therefore, control the devices by using CEC messages, thus improving user convenience.

Figure 1:
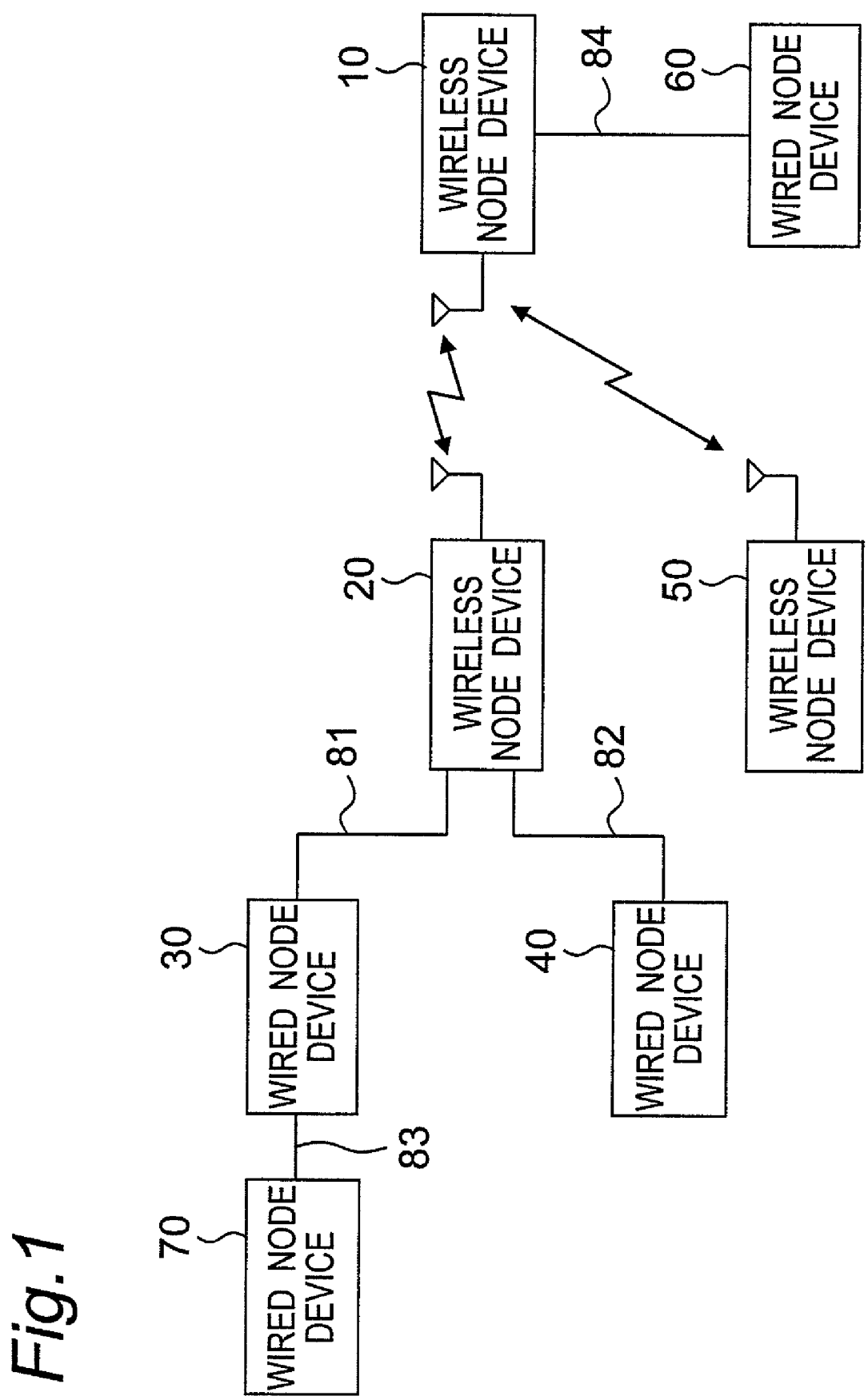
FIG. 1 is a block diagram showing an exemplary configuration of a wireless communication system according to a first preferred embodiment of the present invention.

DESCRIPTION OF REFERENCE NUMERALS 10, 20, and 50 . . . wireless node device
30, 40, 60, and 70 . . . wired node device
11, 21, 31, 41, 51, 61, and 71 . . . controller
11A, 21A, 31A, 41A, 51A, 61A, and 71A . . . CEC controller
11B, 21B, 31B, 41B, 51B, 61B, and 71B . . . address list memory
11C . . . address management controller
12, 24, and 54 . . . wireless transceiver circuit
12A, 24A, and 54A . . . transmission data memory
13, 23, and 33 . . . video and audio processing circuit
14, 22, 32, 43, 52, 63, and 73 . . . wired interface circuit
15 . . . display
16 . . . speaker
17, 25, and 55 . . . antenna
42, 53, 62, and 72 . . . video and audio player
81, 82, 83, and 84 . . . HDMI cable
101 . . . identifier field
102 . . . logical address field
103 . . . flag field
104 . . . physical address field
201 . . . number-of-devices field
202a to 202n . . . A-bit
302a to 303n . . . D-bit
204a to 204n . . . address field
205a to 205n . . . identifier field

BEST MODE FOR CARRYING OUT THE INVENTION

Embodiments according to the present invention will be described below with reference to the drawings.

First Preferred Embodiment

Figure 2:
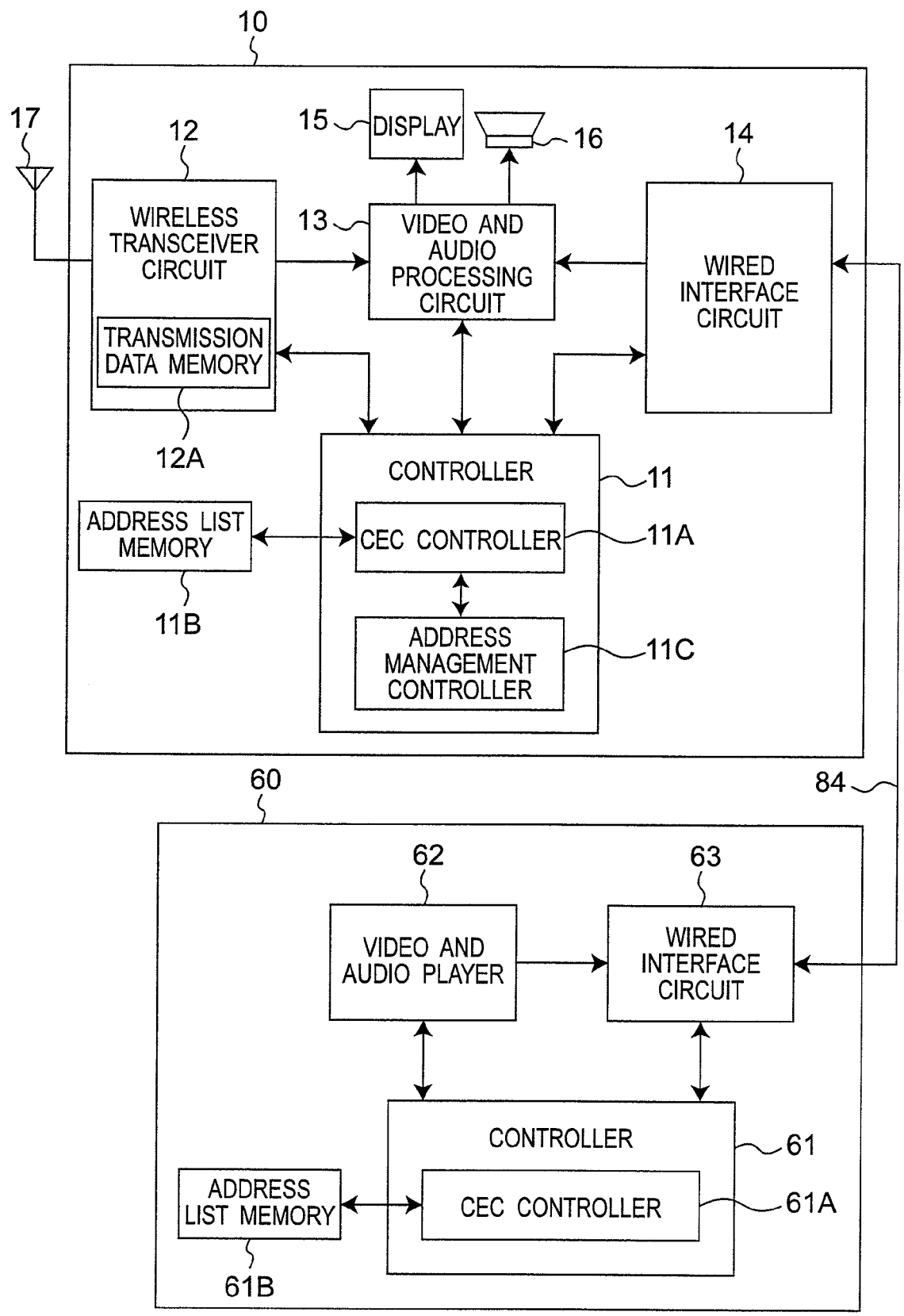
FIG. 2 is a block diagram showing detailed configurations of a wireless node device 10 and a wired node device 60 of FIG. 1.
Figure 3:
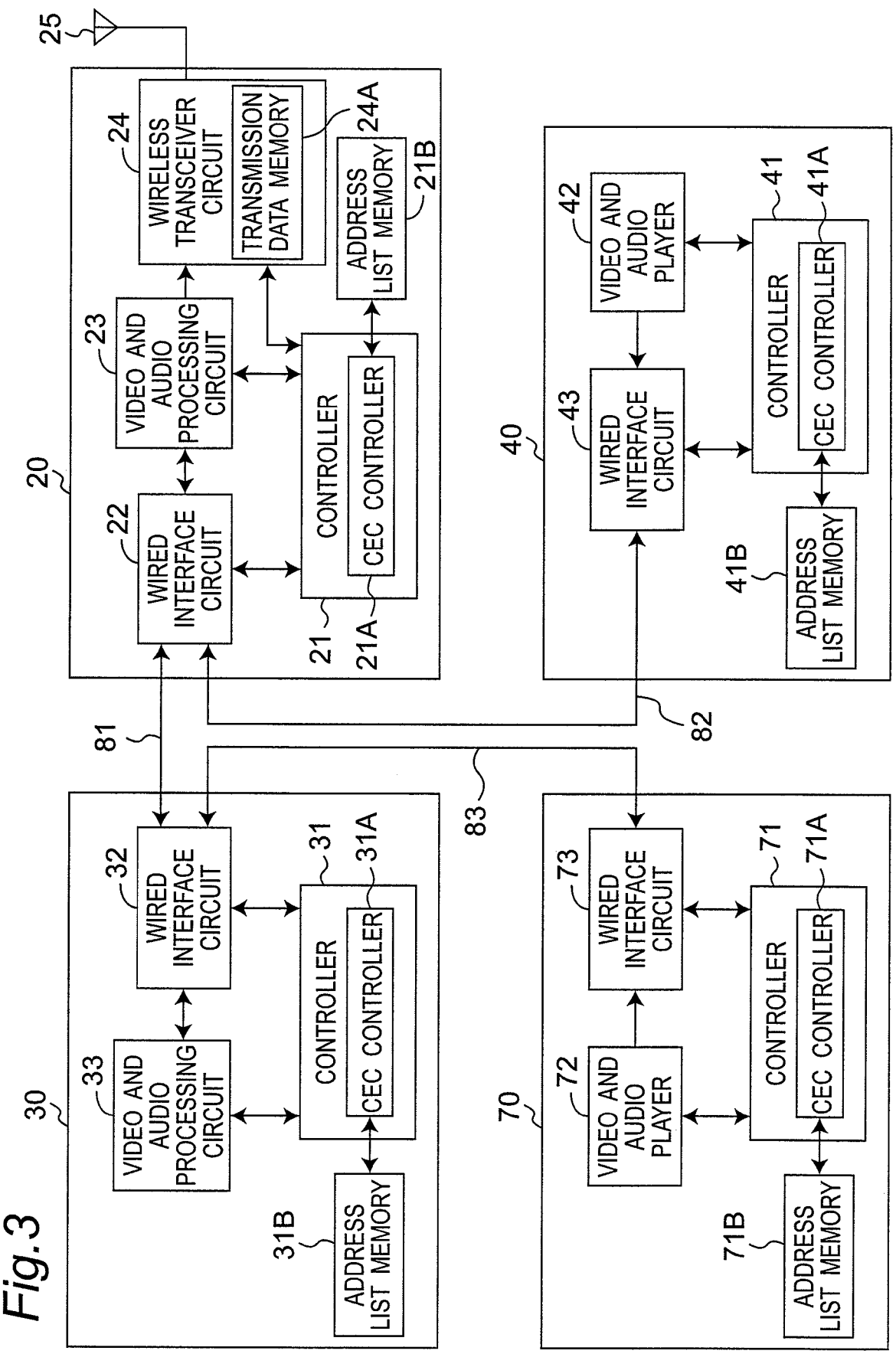
FIG. 3 is a block diagram showing detailed configurations of a wireless node device 20 and wired node devices 30, 40, and 70 of FIG. 1.
Figure 4:
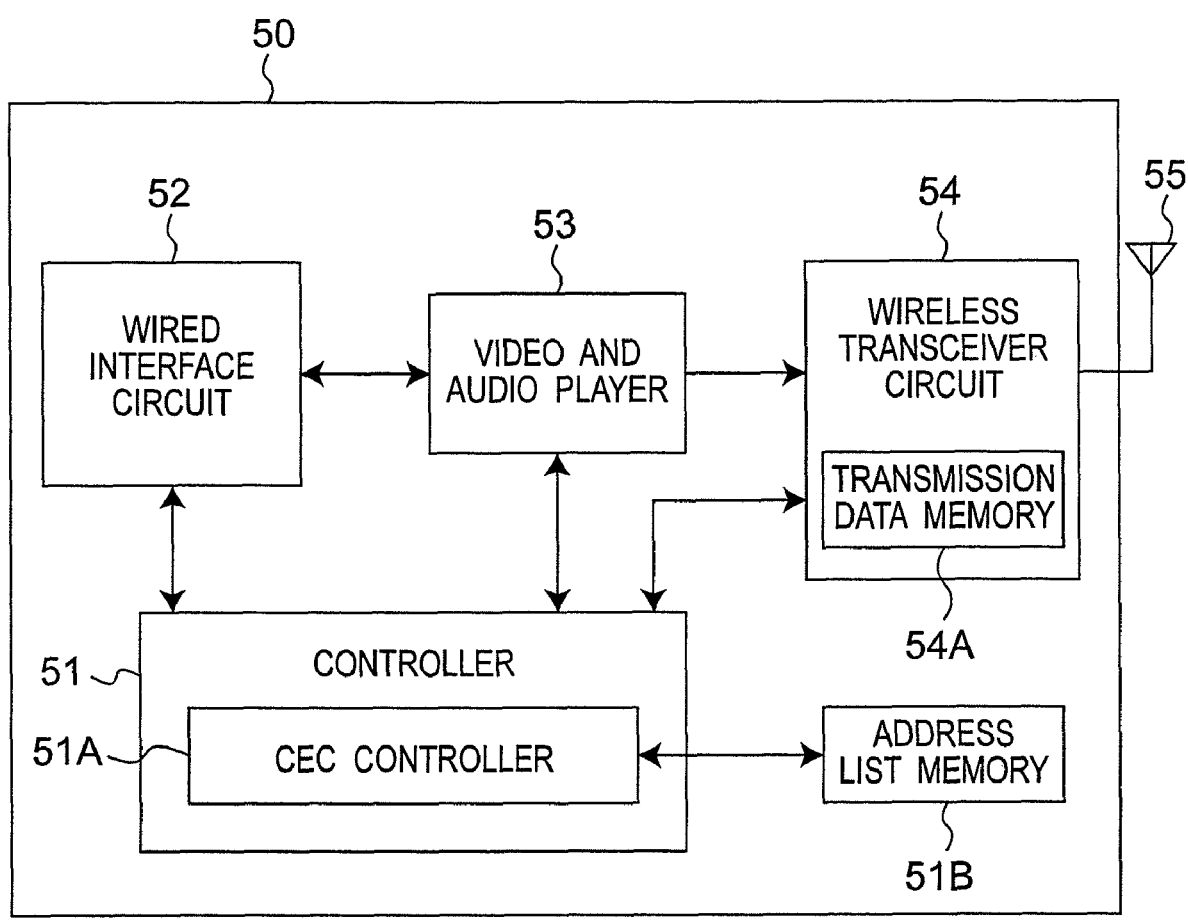
FIG. 4 is a block diagram showing a detailed configuration of a wireless node device 50 of FIG. 1.

FIG. 1 is a block diagram showing an exemplary configuration of a wireless communication system according to a first preferred embodiment of the present invention, and FIGS. 2 to 4 are block diagrams showing detailed configurations of wireless node devices 10, 20, and 50 and wired node devices 30, 40, 70, and 60 of FIG. 1. Referring to FIGS. 1 to 4, the wired node devices 30, 40, 70, and 60 are configured as a device each provided with only a conventional HDMI wired interface, and the wireless node devices 10, 20, and 50 are configured as a device each provided with a wireless interface and a conventional HDMI wired interface. The wireless node device 20 is connected to the wired node device 30 through an HDMI cable 81, the wireless node device 20 is connected to the wired node device 40 through an HDMI cable 82, the wired node devices 30 is connected to the wired node devices 70 through an HDMI cable 83, and the wireless node device 10 is connected to the wired node device 60 through an HDMI cable 84. These devices transmit data to each other using their wired interfaces. In addition, the wireless node devices 10, 20, and 50 transmit data to each other using their wireless interfaces over wireless intervals.

Referring to FIG. 2, the wireless node device 10 includes: a wireless transceiver circuit 12 connected to an antenna 17 and serving as a wireless interface that performs processes such as transmission/reception and modulation/demodulation of radio signals; a video and audio processing circuit 13 for processing content information transmitted from other node devices, for playback; a wired interface circuit 14 having an HDMI input port; and a controller 11 for controlling the wireless transceiver circuit 12, the video and audio processing circuit 13, and the wired interface circuit 14. A display 15 and a speaker 16 are connected to the video and audio processing circuit 13. In addition, the controller 11 includes a CEC controller 11A for controlling transmission and reception of CEC messages, and an address management controller 11C for assigning an address to each of all the node devices in the wireless communication system, for transmission over the wireless intervals. The CEC controller 11A is connected with an address list memory 11B storing an address list table which contains the logical addresses of the respective devices in the system and contains information required for transmission over the wireless intervals. The wireless transceiver circuit 12 includes a transmission data memory 12A for buffering data to be transmitted over the air and storing the data for retransmission.

Referring to FIG. 2 again, the wired node device 60 includes: a video and audio player 62 that is a tuner, or that reads out content information from a recording medium such as a DVD; a wired interface circuit 63 having an HDMI output port; and a controller 61 for controlling the video and audio player 62 and the wired interface circuit 63. The output port of the wired interface circuit 63 is connected to the input port of the wired interface circuit 14 of the wireless node device 10 through the HDMI cable 84, and thus, the wired node device 60 operates as a Source device and the wireless node device 10 operates as a Sink device. The controller 61 includes a CEC controller 61A for controlling transmission and reception of CEC messages. The CEC controller 61A is connected with an address list memory 61B for storing an address list table which contains the logical addresses of the respective devices in the system.

Referring to FIG. 3, the wireless node device 20 includes: a wired interface circuit 22 having HDMI input ports; a video and audio processing circuit 23 for recording of content information or performing other processes; a wireless transceiver circuit 24 connected to an antenna 25 and serving as a wireless interface that performs processes such as transmission/reception and modulation/demodulation of radio signals; and a controller 21 for controlling the wired interface circuit 22, the video and audio processing circuit 23, and the wireless transceiver circuit 24. The wired interface circuit 22 may further have an HDMI output port. In addition, the controller 21 includes a CEC controller 21A for controlling transmission and reception of CEC messages. The CEC controller 21A is connected with an address list memory 21B for storing an address list table which contains the logical addresses of the respective devices in the system and contains information required for transmission over wireless intervals. The wireless transceiver circuit 24 includes a transmission data memory 24A for buffering data to be transmitted over the air and storing the data for retransmission.

Referring to FIG. 3 again, the wired node device 30 includes: a wired interface circuit 32 having HDMI input and output ports; a video and audio processing circuit 33 for recording of content information or performing other processes; and a controller 31 for controlling the wired interface circuit 32 and the video and audio processing circuit 33. The output port of the wired interface circuit 32 is connected to the input port of the wired interface circuit 22 of the wireless node device 20 through the HDMI cable 81, and thus, the wired node device 30 operates as a Source device and the wireless node device 20 operates as a Sink device. In addition, the controller 31 includes a CEC controller 31A for controlling transmission and reception of CEC messages. The CEC controller 31A is connected with an address list memory 21B for storing an address list table which contains the logical addresses of the respective devices in the system.

Referring to FIG. 3 again, the wired node device 40 includes: a video and audio player 42 that is a tuner, or that reads out content information from a recording medium such as a DVD; a wired interface circuit 43 having an HDMI output port; and a controller 41 for controlling the video and audio player 42 and the wired interface circuit 43. The output port of the wired interface circuit 43 is connected to the input port of the wired interface circuit 22 of the wireless node device 20 through the HDMI cable 82, and thus, the wired node device 40 operates as a Source device and the wireless node device 20 operates as a Sink device. The controller 41 includes a CEC controller 41A for controlling transmission and reception of CEC messages. The CEC controller 41A is connected with an address list memory 41B for storing an address list table which contains the logical addresses of the respective devices in the system.

Referring to FIG. 3 again, the wired node device 70 includes: a video and audio player 72 that is a tuner, or that reads out content information from a recording medium such as a DVD; a wired interface circuit 73 having an HDMI output port; and a controller 71 for controlling the video and audio player 72 and the wired interface circuit 73. The output port of the wired interface circuit 73 is connected to the input port of the wired interface circuit 32 of the wired node device 30 through the HDMI cable 83, and thus, the wired node device 70 operates as a Source device and the wired node device 30 operates as a Sink device. The controller 71 includes a CEC controller 71A for controlling transmission and reception of CEC messages. The CEC controller 71A is connected with an address list memory 71B for storing an address list table which contains the logical addresses of the respective devices in the system.

Referring to FIG. 4, the wireless node device 50 includes: a wired interface circuit 52 having HDMI input and output ports; a video and audio player 53 that is a tuner, or that reads out content information from a recording medium such as a DVD; a wireless transceiver circuit 54 connected to an antenna 55 and serving as a wireless interface that performs processes such as transmission/reception and modulation/demodulation of radio signals; and a controller 51 for controlling the wired interface circuit 52, the video and audio player 53, and the wireless transceiver circuit 54. The wired interface circuit 52 may be optionally omitted. The controller 51 includes a CEC controller 51A for controlling transmission and reception of CEC messages. The CEC controller 51A is connected with an address list memory 51B for storing an address list table which contains the logical addresses of the respective devices in the system and contains information required for transmission over wireless intervals. The wireless transceiver circuit 54 includes a transmission data memory 54A for buffering data to be transmitted over the air and storing the data for retransmission.

The CEC controllers 11A, 21A, and 51A of the respective wireless node devices 10, 20, and 50 mainly perform the following processes.

(1) Process of checking whether or not other node devices are connected in a CEC bus (i.e., connected by wire through HDMI cables).

(2) Process of adding and deleting logical addresses to/from the respective address list tables in the address list memories 11B, 21B, and 51B.

(3) Process of making a proxy response to a polling message from another node device connected by wire through HDMI cables.

(4) Process of exchanging the address list tables among the wireless node devices 10, 20, and 50.

Each of the wireless transceiver circuits 12, 24, and 54 includes a radio frequency circuit, a baseband processing circuit, a medium access control circuit, etc., and can use arbitrary wireless transmission scheme; its further explanation is omitted in the present embodiment. For example, it is possible to use a wireless transmission scheme defined in IEEE 802.11 using radio wave in 2.4 GHz band or 5 GHz band, or a wireless transmission scheme using radio wave in millimeter wave band.

With reference to flowcharts of FIGS. 5 to 8, processes performed by the CEC controller 21A of the wireless node device 20 of FIG. 3 will be described below.

Figure 5:
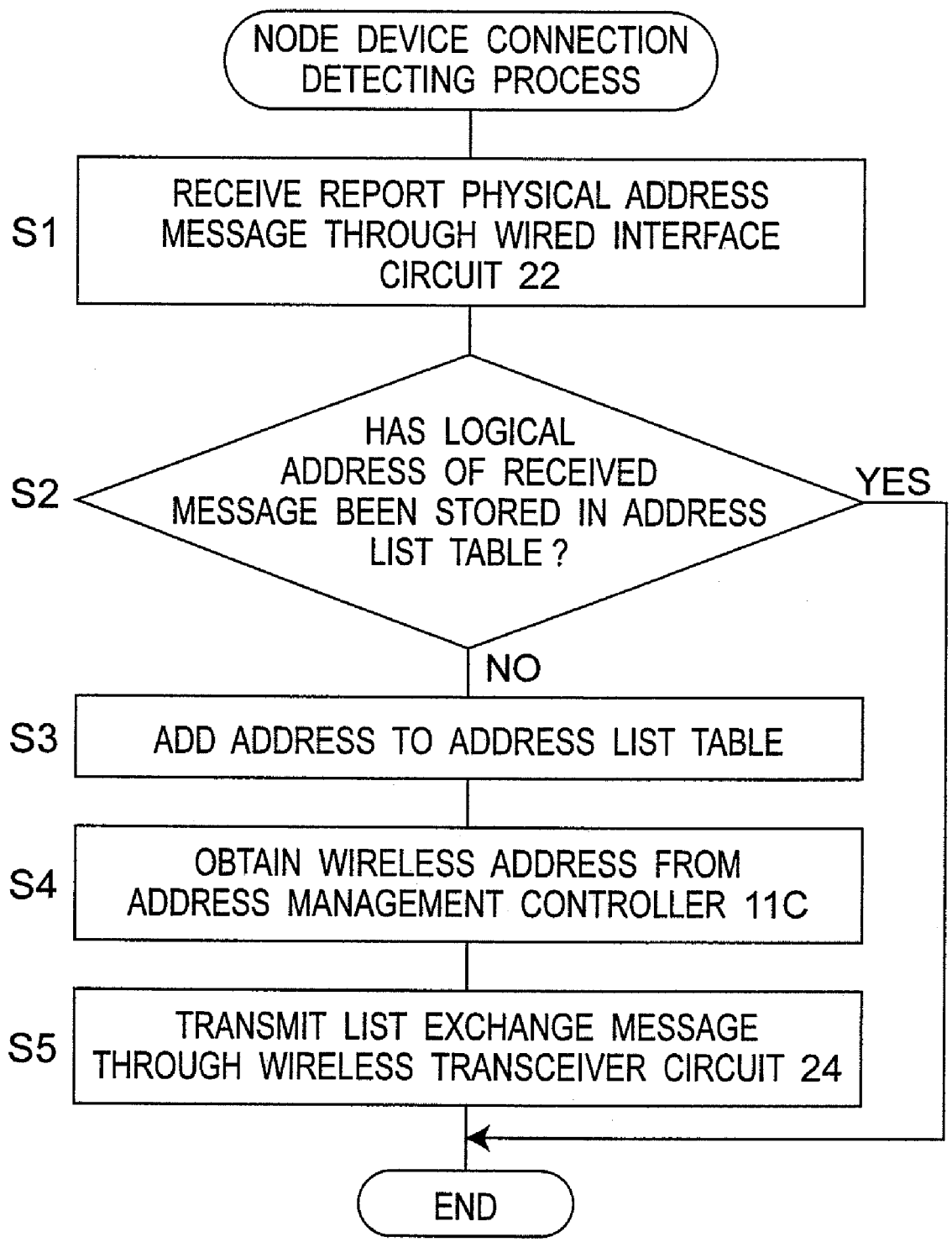
FIG. 5 is a flowchart showing a node device connection detecting process performed by a CEC controller 21A of the wireless node device 20 of FIG. 3.

FIG. 5 is a flowchart showing a node device connection detecting process performed by the CEC controller 21A of the wireless node device 20. This process is performed to detect another node device connected by wire to the wireless node device 20. In step S1 of FIG. 5, the CEC controller 21A receives a Report Physical Address message through the wired interface circuit 22. The Report Physical Address message refers to a message defined in HDMI, which is used when a certain node device notifies the other node devices of an association between the physical address and logical address for the node device (See Non-Patent Document 1). Once a Report Physical Address message is received in step S1, then in step S2, the CEC controller 21A refers to the address list table in the address list memory 21B, and determines whether or not an originating logical address of the received Report Physical Address message has already been stored in the address list table; if NO then the process proceeds to step S3, and if YES then the process ends. In step S3, the CEC controller 21A adds a logical address, which has been set in the originating logical address of the Report Physical Address message, to the address list table in the address list memory 21B, and sets a flag in an item for a node device corresponding to the logical address such that the flag is set to 1. This flag is to indicate whether each node device in the address list table is connected to the wireless node device 20 by wire (flag value=1) or over a wireless interval (flag value=0). In this case, a flag value of the wireless node device 20 itself is 1. The flag value=1, as well as a logical address of the wireless node device 20 itself are stored in the address list table, prior to the process of FIG. 5.

Then in step S4, the CEC controller 21A obtains a wireless address serving as an identifier for transmission over wireless intervals, from the address management controller 11C of the wireless node device 10. The address management controller 11C of the wireless node device 10 performs an address managing process by which a wireless address for transmission over wireless intervals is assigned to each of all the node devices (regardless of whether the device is wired or wireless) in the wireless communication system. The wireless addresses to be assigned are, for example, MAC addresses, or device IDs for uniquely identifying each device and with fewer bits than that of the MAC addresses, etc., and alternatively, any device identifiers can be used as long as one can uniquely identify each node device. In the address management process, each node device performs an authentication process with the address management controller 11C when joining the wireless communication system, and after completion of the authentication process, a wireless address is assigned to each node device. In the present embodiment, the CEC controller 21A of the wireless node device 20 obtains a wireless address for the wireless node device 20 from the address management controller 11C, and in step S4 of FIG. 5, obtains a wireless address for the wired node device 10 connected by wire to the wireless node device 20, from the address management controller 11C, by performing an authenticating process with the address management controller 11C on behalf of the wired node device 10, and then, the CEC controller 21A stores the wireless addresses, as identifiers, in the address list table in the address list memory 21B.

Figure 9:
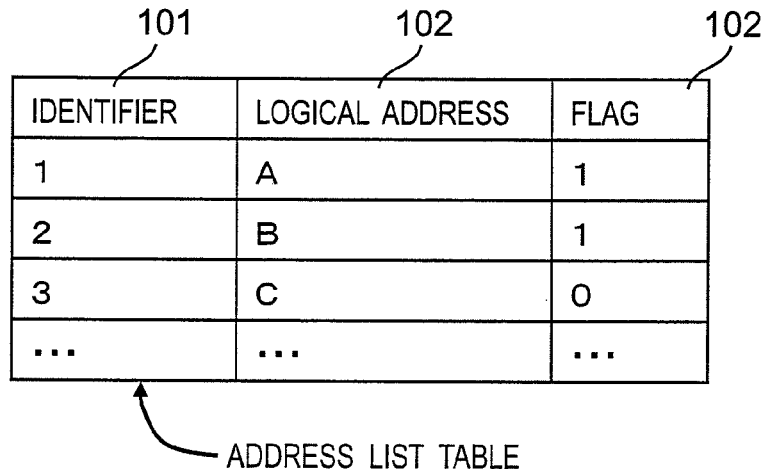
FIG. 9 is a diagram showing an exemplary format of an address list table 1 stored in an address list memory 21B of the wireless node device 20 of FIG. 3.

FIG. 9 is a diagram showing an exemplary format of the address list table in the address list memory 21B. Referring to FIG. 9, an identifier field 101 is a field for storing wireless addresses used for identifying each node device over wireless intervals, a logical address field 102 is a field for storing logical addresses each set in an originating logical address of a Report Physical Address message, and a flag field 103 is a field for storing a flag indicating whether or not each node device in the address list table is connected by wire to the wireless node device 20. The address list table may contain other fields than those listed in the present embodiment. Moreover, different formats may be used as long as the same operational effects are provided.

After performing steps S3 and S4, the CEC controller 21A transmits, in step S5, a list exchange message containing contents of the address list table (the entire table, or changed portions thereof) to the other wireless node devices 10 and 50 through the wireless transceiver circuit 24.

Figure 10:
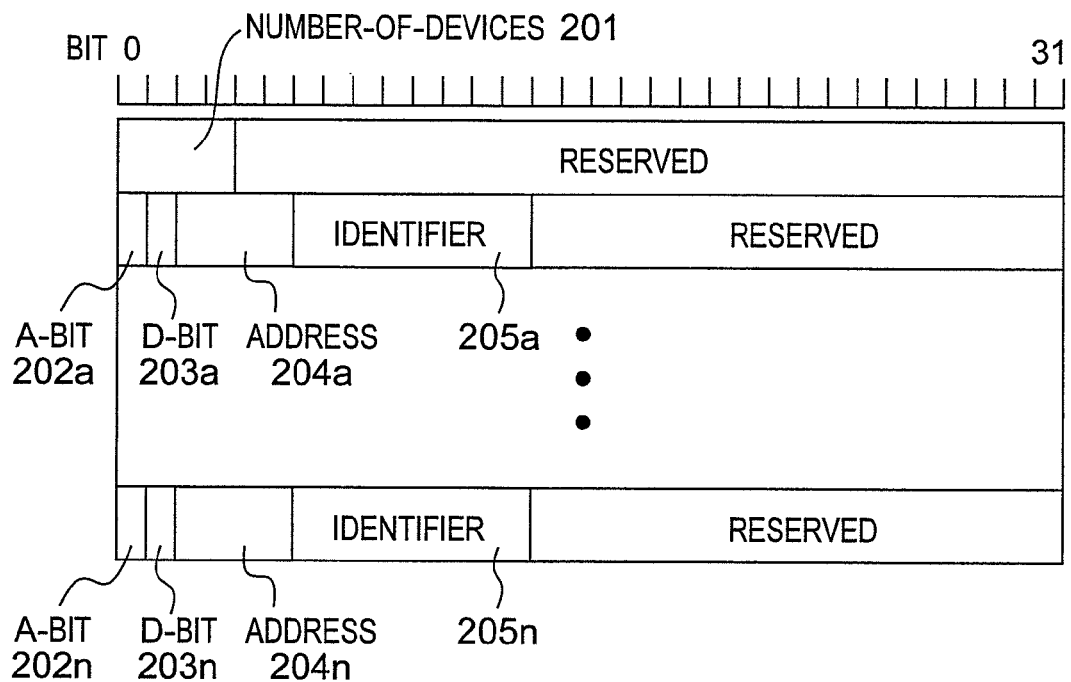
FIG. 10 is a diagram showing an exemplary format of a list exchange message of FIGS. 5 to 7.

FIG. 10 is a diagram showing an exemplary format of the list exchange message. Referring to FIG. 10, a number-of-devices field 201 is a field for setting the number of node devices whose logical addresses have been changed (i.e., added or deleted), A-bit fields 202*a* to 202*n* are a field each indicating addition of a logical address, D-bit fields 203*a* to 203*n* are a field each indicating deletion of a logical address, address fields 204*a* to 204*n* are a field each indicating a logical address to be deleted or added, and identifier fields 205*a* to 205*n* are a field each indicating an identifier (wireless address) associated with a logical address contained in each of the address fields 204*a* to 204*n*. Values to be contained in these fields are determined based on changed portions of the address list table in the address list memory 21B, resulting from addition of an address in step S3 of FIG. 5 and/or deletion of an address according to a process of FIG. 6 (described later). The number of items for the respective node devices contained in the list exchange message (each item corresponds to a set of an A-bit field, a D-bit field, an address field, and an identifier field) is the same as the number which is set in the number-of-devices field 201. In addition to these fields, the list exchange message is provided with a MAC header etc., which is omitted for ease of explanation.

Figure 11:
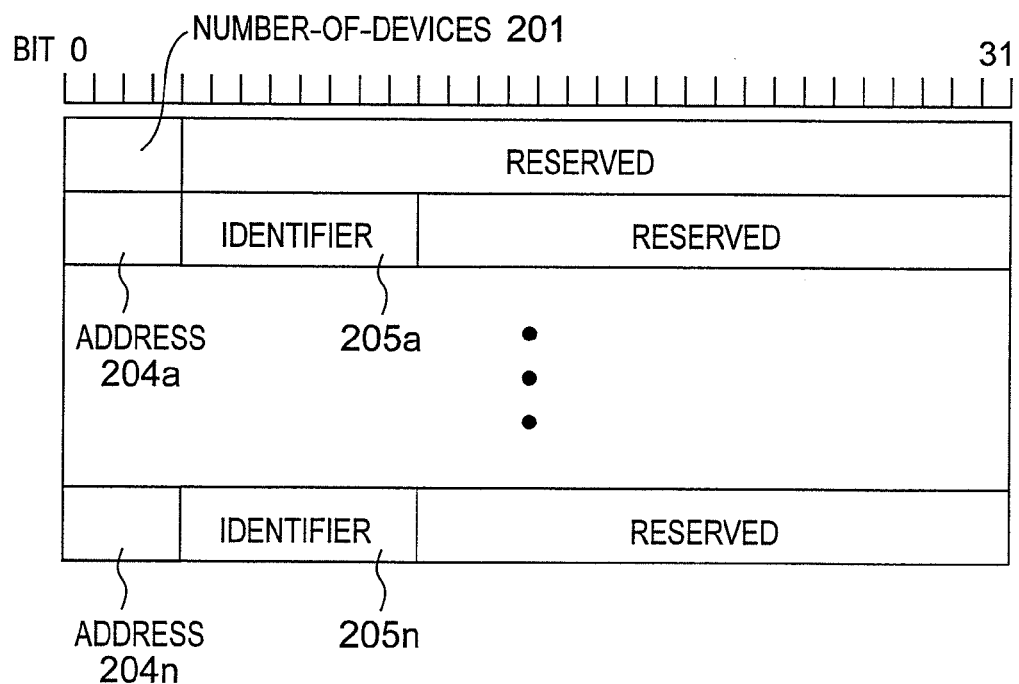
FIG. 11 is a diagram showing another exemplary format of the list exchange message of FIGS. 5 to 7.

FIG. 11 is a diagram showing another exemplary format of the list exchange message. Referring to FIG. 11, this format is used when exchanging not only changed logical addresses, but exchanging all logical addresses and corresponding identifiers, stored in the address list table in the address list memory 21B. Therefore, in a number-of-devices field 201 is set the number of logical addresses contained in the address list table in the address list memory 21B, and address fields 204*a* to 204*n* and identifier fields 205*a* to 205*n* contain all the logical addresses and the corresponding identifiers in the address list table. Values to be contained in these fields are determined based on the entire address list table in the address list memory 21B, resulting from addition of an address in step S3 of FIG. 5 and/or deletion of an address according to the process of FIG. 6 (described later). With respect to the format of the list exchange message, different formats than those shown of FIGS. 10 and 11 may be used as long as the same operational effects are provided.

Each time the CEC controller 21A receives a Report Physical Address message from a node device through the wired interface circuit 22, the CEC controller 21A repeats the process from steps S1 to S5 of FIG. 5.

Figure 6:
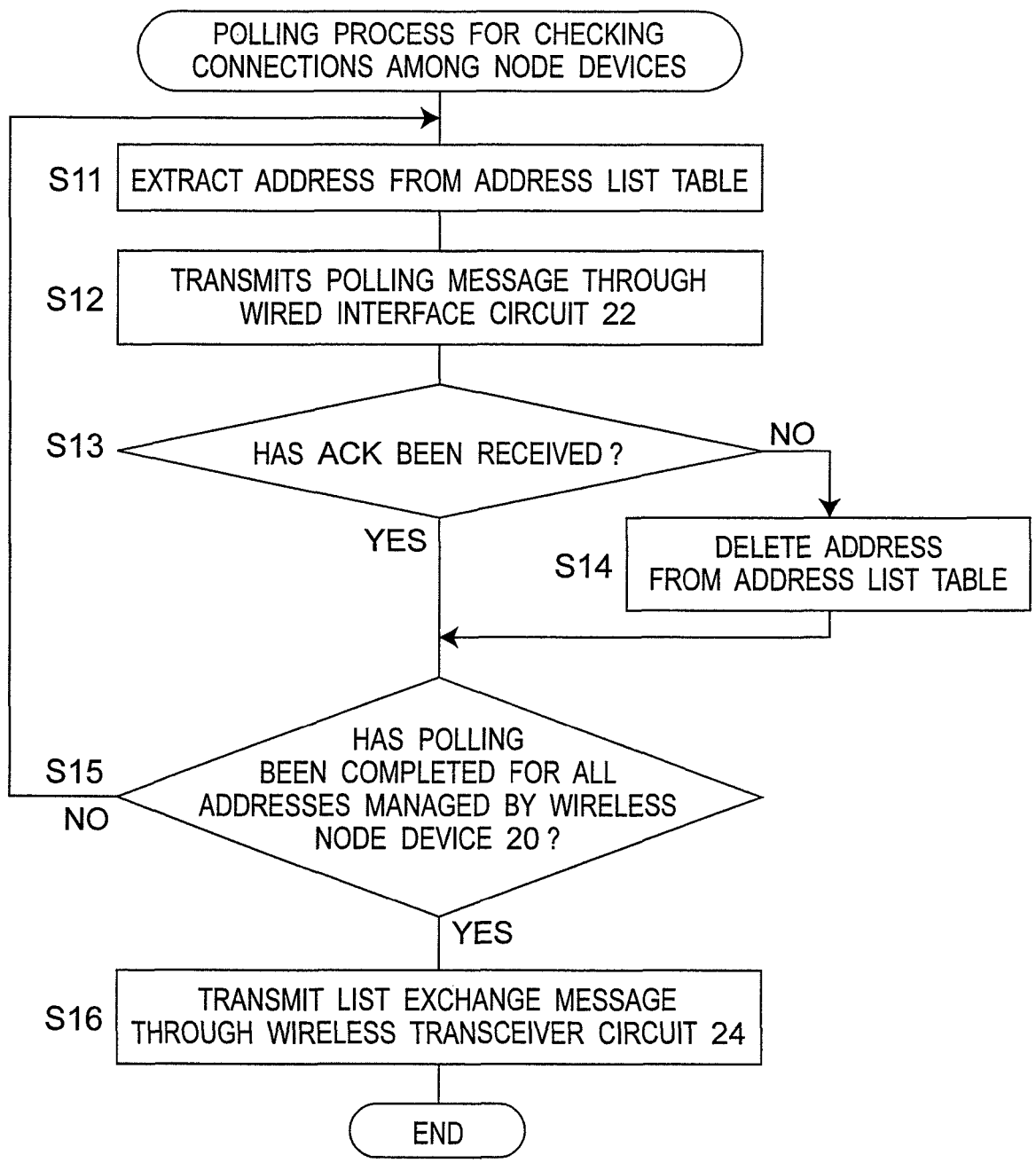
FIG. 6 is a flowchart showing a polling process for checking connections among node devices, performed by the CEC controller 21A of the wireless node device 20 of FIG. 3.

FIG. 6 is a flowchart showing a polling process for checking connections among node devices, which is performed by the CEC controller 21A of the wireless node device 20. This process is performed to check whether or not there actually exist node devices managed in the address list table in the address list memory 21B and supposed to be connected by wire to the wireless node device 20. In step S11 of FIG. 6, the CEC controller 21A of the wireless node device 20 refers to the address list table in the address list memory 21B, and extracts a logical address of a node device whose flag value is 1 (i.e., which is connected by wire to the wireless node device 20). Then, in step S12, the CEC controller 21A transmits a polling message destined for the extracted logical address through the wired interface circuit 22, for checking the connection. Thereafter, in step S13, the CEC controller 21A determines whether or not the wired interface circuit 22 has detected an ACK for the polling message; if YES then the process proceeds to step S15, and if NO then the process proceeds to step S14.

If an ACK has not been received within a predetermined period of time after transmitting the polling message (NO in step S13), then the CEC controller 21A deletes an item for the node device corresponding to the destination logical address of the polling message, from the address list table in the address list memory 21B. On the other hand, if an ACK detection notification has been inputted within the predetermined period of time after transmitting the polling message (YES in step S13), then in step S15, the CEC controller 21A determines whether or not polling has been completed for all logical addresses corresponding to node devices whose flag values are 1, among logical addresses in the address list memory 21B of the wireless node device 20 managed by the CEC controller 21A. If NO in step S15, then the process returns to step S11 to perform the same operation on a logical address corresponding to another node device whose flag value is 1 (note that the wireless node device 20 itself is excluded), contained in the address list table. On the other hand, if YES in step S15, then the process proceeds to step S16 to transmit list exchange messages to the other wireless node devices 10 and 50 through the wireless transceiver circuit 24 in a manner similar to step S5 of FIG. 5, and ends the process. The polling process of FIG. 6 is repeated with a predetermined period of time.

Figure 7:
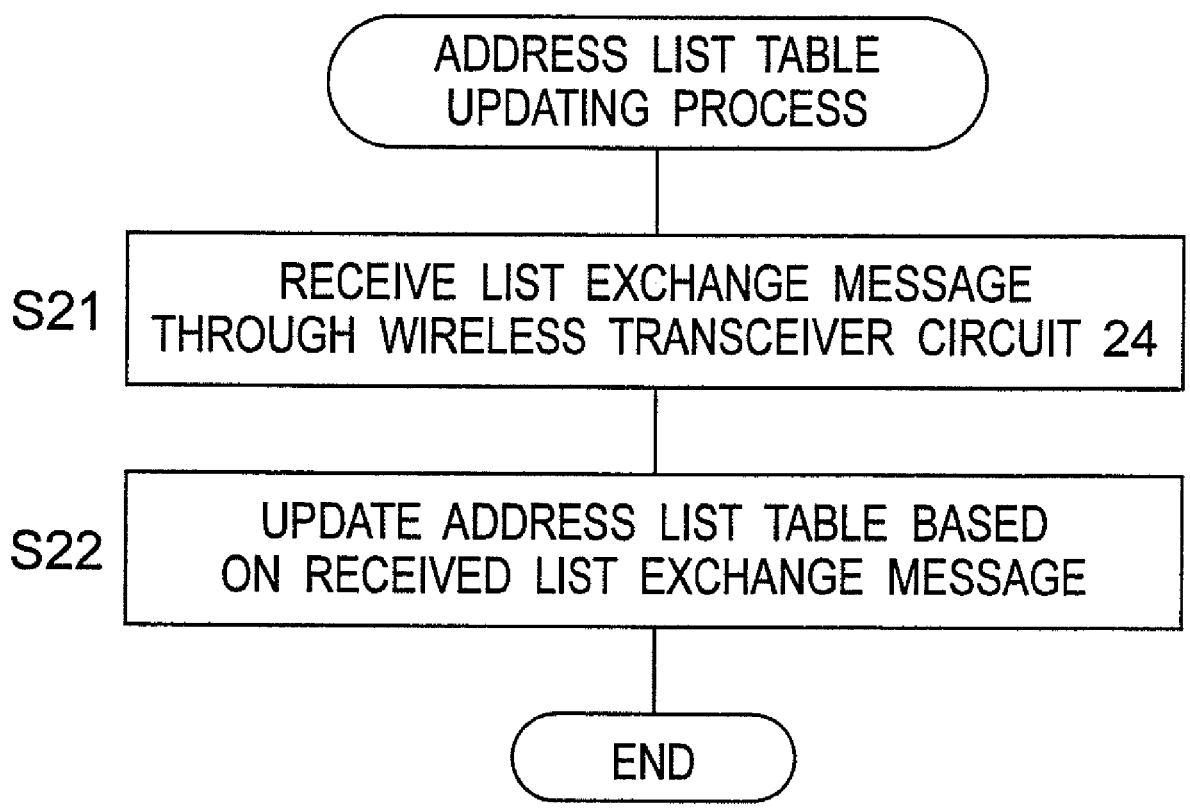
FIG. 7 is a flowchart showing an address list table updating process performed by the CEC controller 21A of the wireless node device 20 of FIG. 3.

FIG. 7 is a flowchart showing an address list table updating process performed by the CEC controller 21A of the wireless node device 20. The other wireless node devices 10 and 50 in the wireless communication system also perform the processes of FIGS. 5 and 6 in a manner similar to that of the wireless node device 20, and thus, the wireless node device 10 stores, in the address list table in the address list memory 11B, information on the wireless node device 10 itself and information on the wired node device 60 connected by wire to the wireless node device 10, and the wireless node device 50 stores, in the address list table in the address list memory 51B, information on the wireless node device 50 itself and information on a node device connected by wire to the wireless node device 50 (none in the example shown in FIGS. 1 to 4). The wireless node devices 10, 20, and 50 exchange the information in the address list tables with one another in step S5 of FIG. 5 and step S16 of FIG. 6 and in the process of FIG. 7.

In step S21 of FIG. 7, once the CEC controller 21A of the wireless node device 20 receives a list exchange message from the wireless node device 10 or 50 through the wireless transceiver circuit 24, the CEC controller 21A then in step S22 updates the address list table in the address list memory 21B based on the received list exchange message, and ends the process. For example, in the case that the list exchange message has a format shown in FIG. 10, then in step S22, the CEC controller 21A updates the address list table in the address list memory 21B such that values of logical addresses and identifiers, corresponding to node devices whose A-bit fields 202a to 202n of the list exchange message are "1", are added to the address list table from the list exchange message, and further, the flag values of added items are set to "0". Furthermore, the CEC controller 21A deletes logical addresses, identifiers, and flags, corresponding to node devices whose D-bit fields 203a to 203n of the list exchange message are "1", from the address list table in the address list memory 21B. Also in the case that the list exchange message has the format shown in FIG. 11, the CEC controller 21A updates the address list table in the address list memory 21B based on contents of the list exchange message.

In this manner, each of the wireless node devices 10, 20, and 50 can store, in its address list table, the logical addresses and the identifiers for all the node devices in the wireless communication system. In addition, each of the wireless node devices 10, 20, and 50 can distinguish whether each node device is connected to the wireless node device by wire or over a wireless interval, by referring to the flag values in the address list table. Further, of course, the address list tables of the respective wired node devices 30, 40, 60, and 70 have neither an identifier field nor a flag field.

Figure 8:
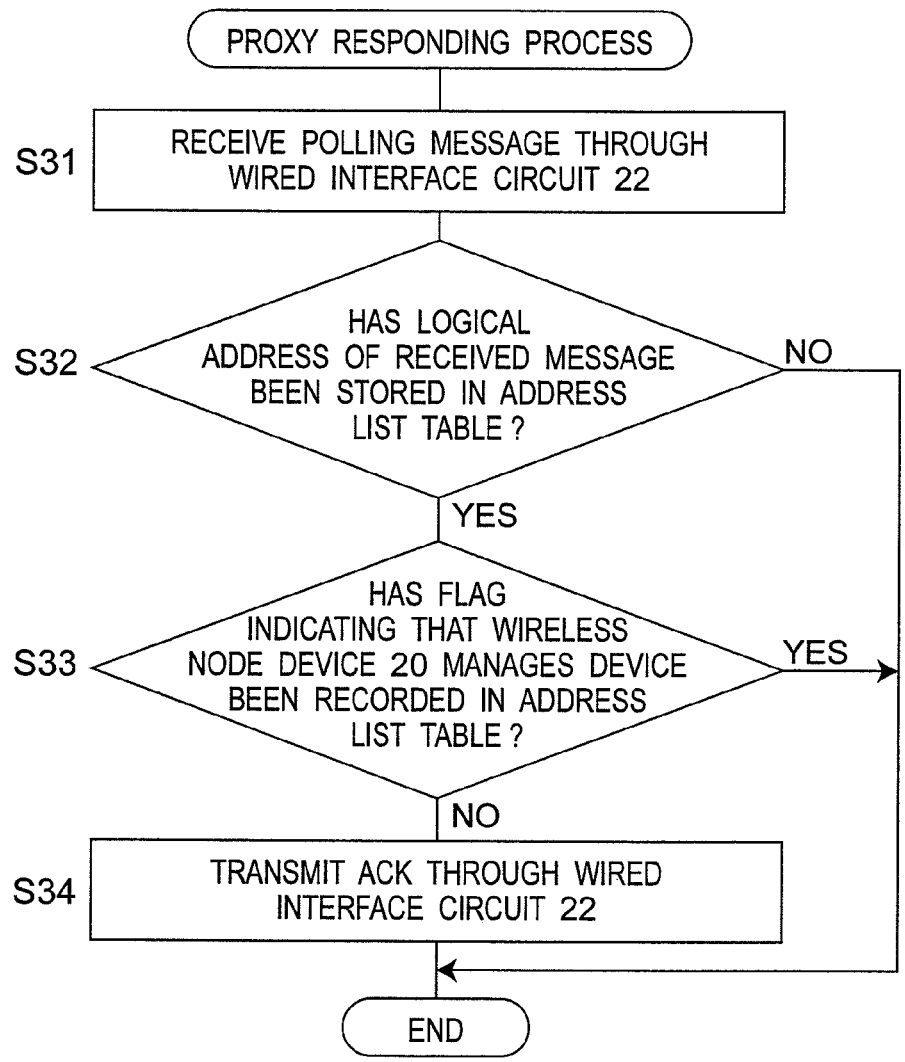
FIG. 8 is a flowchart showing a proxy responding process performed by the CEC controller 21A of the wireless node device 20 of FIG. 3.

FIG. 8 is a flowchart showing a proxy responding process performed by the CEC controller 21A of the wireless node device 20. The proxy response is a process performed when a destination logical address of a polling message for a logical address assignment, which was transmitted by one of the node devices in the wireless communication system, has been already used by another node device connected over a wireless interval.

In step S31 of FIG. 8, once the CEC controller 21A of the wireless node device 20 receives a polling message through the wired interface circuit 22, the CEC controller 21A refers to the address list table in the address list memory 21B, and in step S32, determines whether or not a destination logical address of the received polling message has been stored in the address list table; if YES then the process proceeds to step S33, and if NO then the process ends. In step S33, the CEC controller 21A further determines whether or not "1" is a flag value of an item in the address list table, the item containing a logical address that matches the destination logical address of the received polling message; if YES then the process ends, and if NO then the process proceeds to step S34. When YES in step S33, one of the node devices connected by wire to the wireless node device 20 will transmit an ACK, and thus, a proxy response by the wireless node device 20 is not required. On the other hand, when NO in step S33, the destination logical address contained in the polling message has been already used by another node device connected over a wireless interval, and thus, on behalf of the node device using the logical address, the CEC controller 21A of the wireless node device 20 transmits in step S34 an ACK to an originating node device of the polling message through the wired interface circuit 22, and ends the process.

As described above, the CEC controller 21A of the wireless node device 20 determines whether or not to perform a proxy response, by referring to flag values in the address list table in the address list memory 21B. The address list table in the address list memory 21B is characterized in storing information on the respective node devices in the wireless communication system (identifiers, logical addresses, and flags), particularly storing a flag for distinguishing whether each node device is connected by wire through the wired interface circuit 22 or connected over a wireless interval. The field for a node device connected by wire has a format of "flag=1"; on the other hand, the field for a node device connected over a wireless interval, obtained according to the process of FIG. 2, is of "flag=0". When the destination of a polling message received by the wired interface circuit 22 is a node device with "flag=1", the CEC controller 21A does not perform a proxy response, and when "flag=0", the CEC controller 21A performs a proxy response. In this manner, the CEC controller 21A of the wireless node device 20 of the present embodiment is characterized in that when receiving a polling message from the wired interface circuit 22, the CEC controller 21A makes decision on a destination logical address of the polling message based on the address list table in the address list memory 21B, and if the destination logical address of the polling message is a logical address of a node device connected over a wireless interval, then the CEC controller 21A transmits an ACK for the received polling message from the wired interface circuit 22. Hence, according to the wireless communication system of the present embodiment, even when node devices conforming to HDMI standard are connected over wireless intervals, it is possible to assign a logical address to the respective node devices without conflict, and therefore, control the node devices using CEC messages, thus improving user convenience.

An exemplary operation of the wireless communication system of FIG. 1 will be described below with reference to FIGS. 12 to 14.

When the wireless node device 10 is powered on, the CEC controller 11A of the wireless node device 10 adds a logical address and a flag value=1 for the wireless node device 10 to the address list table in the address list memory 11B, obtains a wireless address for the wireless node device 10 from the address management controller 11C, and adds the wireless address to the address list table as an identifier. For example, when the wireless node device 10 is a TV, "0" is added to the address list table as a logical address. Then, the wireless node device 10 receives a polling message from the wired node device 60 which is connected by wire to the wireless node device 10 through the HDMI cable 84. For example, when the wired node device 60 is a DVD player, "4" is set to a destination logical address of the polling message. At this time, since the address list table in the address list memory 11B of the wireless node device 10 does not contain the destination logical address "4" contained in the polling message, the wireless node device 10 does not return an ACK. Thus, the wired node device 60 determines to use the logical address, contained in the destination logical address of the polling message, as a logical address of the wired node device 60 itself.

Subsequently, the wired node device 60 transmits a Report Physical Address message to the wireless node device 10 (in step S41 of FIG. 12). When receiving the Report Physical Address message, the CEC controller 11A of the wireless node device 10 adds an originating logical address (i.e., the logical address of the wired node device 60) to the address list table in the address list memory 11B, and sets a flag of an item for a node device corresponding to the logical address such that the flag is set to 1. At the same time, the CEC controller 11A of the wireless node device 10 obtains a wireless address for the wired node device 60 from the address management controller 11C, and adds the wireless address to the address list table as an identifier.

Figure 12:
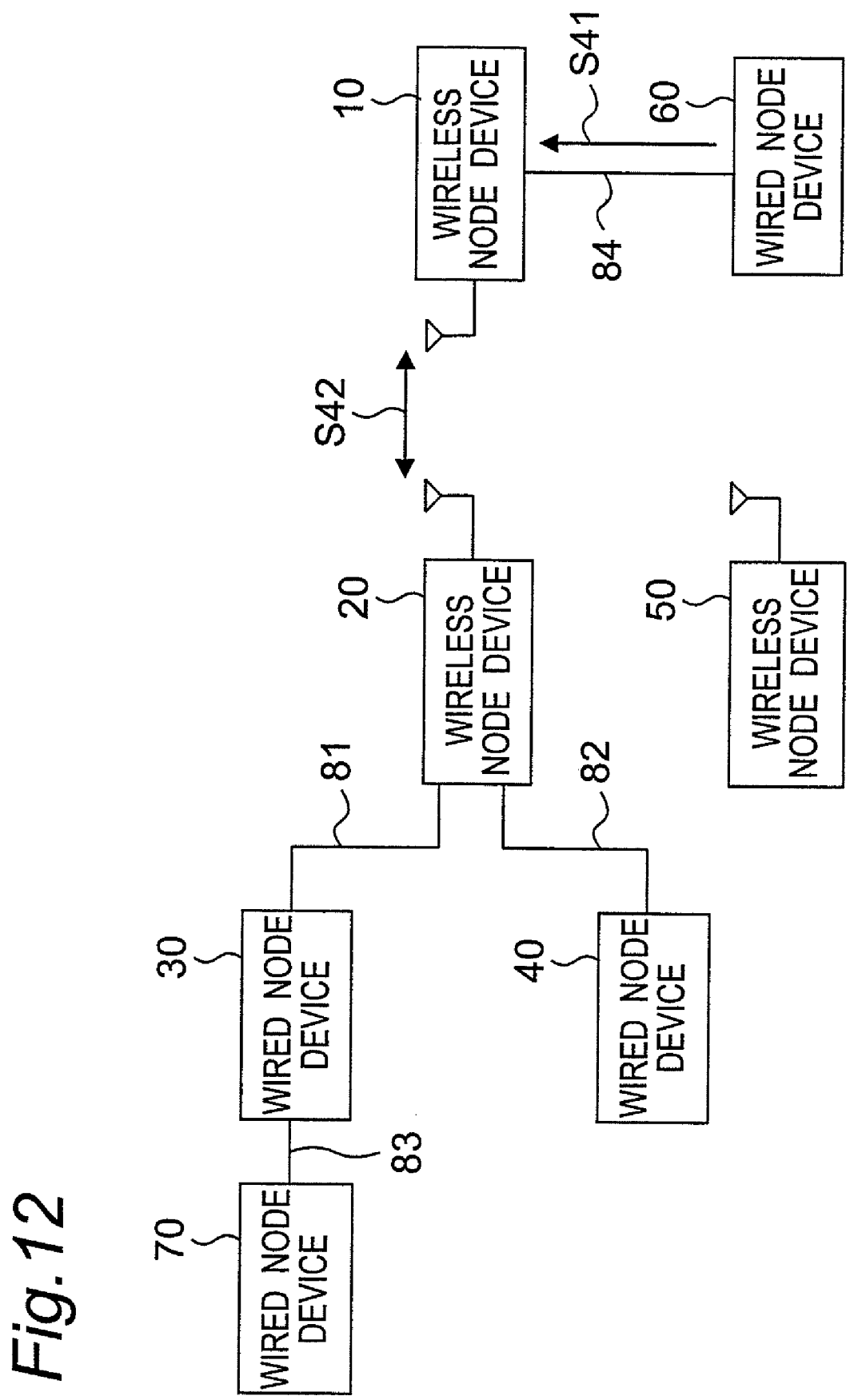
FIG. 12 is a block diagram showing a first part of an exemplary operation of the wireless communication system of FIG. 1.

Thereafter, the wireless node device 10 starts wireless communication with the wireless node device 20 (in step S42 of FIG. 12). After establishing a wireless connection between the wireless node devices 10 and 20, the wireless node device 10 transmits a list exchange message to the wireless node device 20. The list exchange message (See FIG. 10) contains the logical address and the associated identifiers of the wireless node device 10 and the wired node device 60, and 1 is set in each corresponding A-bit.

When receiving the list exchange message, the CEC controller 21A of the wireless node device 20 adds the logical addresses and identifiers contained in the list exchange message to the address list table in the address list memory 21B, because the A-bits corresponding to the respective logical addresses and identifiers are set to 1. Thereafter, the CEC controller 21A of the wireless node device 20 determines a logical address of the wireless node device 20 itself. When determining the logical address, the CEC controller 21A of the wireless node device 20 uses a logical address, which is not contained in the address list table in the address list memory 21B, as the logical address of the wireless node device 20 itself. After the CEC controller 21A of the wireless node device 20 determines the logical address of the wireless node device 20 itself, the CEC controller 21A adds the logical address to the address list table in the address list memory 21B. The CEC controller 21A further sets a flag corresponding to the added logical address such that the flag is set to 1, and further, obtains a wireless address for the wireless node device 20 from the address management controller 11C of the wireless node device 10, and adds the wireless address to the address list table in the address list memory 21B as an identifier. Thereafter, the CEC controller 21A of the wireless node device 20 transmits, to the wireless node device 10, a list exchange message containing the logical address and identifier of the wireless node device 20 and in which the corresponding A-bit is set to 1. When the CEC controller 11A of the wireless node device 10 receives the list exchange message from the wireless node device 20, since 1 is set in the A-bit, the CEC controller 11A adds the logical address and the associated identifier of the wireless node device 20, contained in the list exchange message, to the address list table in the address list memory 11B, and sets a corresponding flag value to 0.

Then, the wireless node device 20 receives a polling message from the wired node device 30 which is connected by wire to the wireless node device 20 through the HDMI cable 81. When a destination logical address contained in the polling message is different from any of the logical addresses of the wireless node devices 10 and 20 and the wired node device 60, the wireless node device 20 does not return an ACK. Thus, the wired node device 30 determines to use the logical address, contained in the destination logical address of the polling message transmitted to the wireless node device 20, as an address of the wired node device 30 itself.

Figure 13:
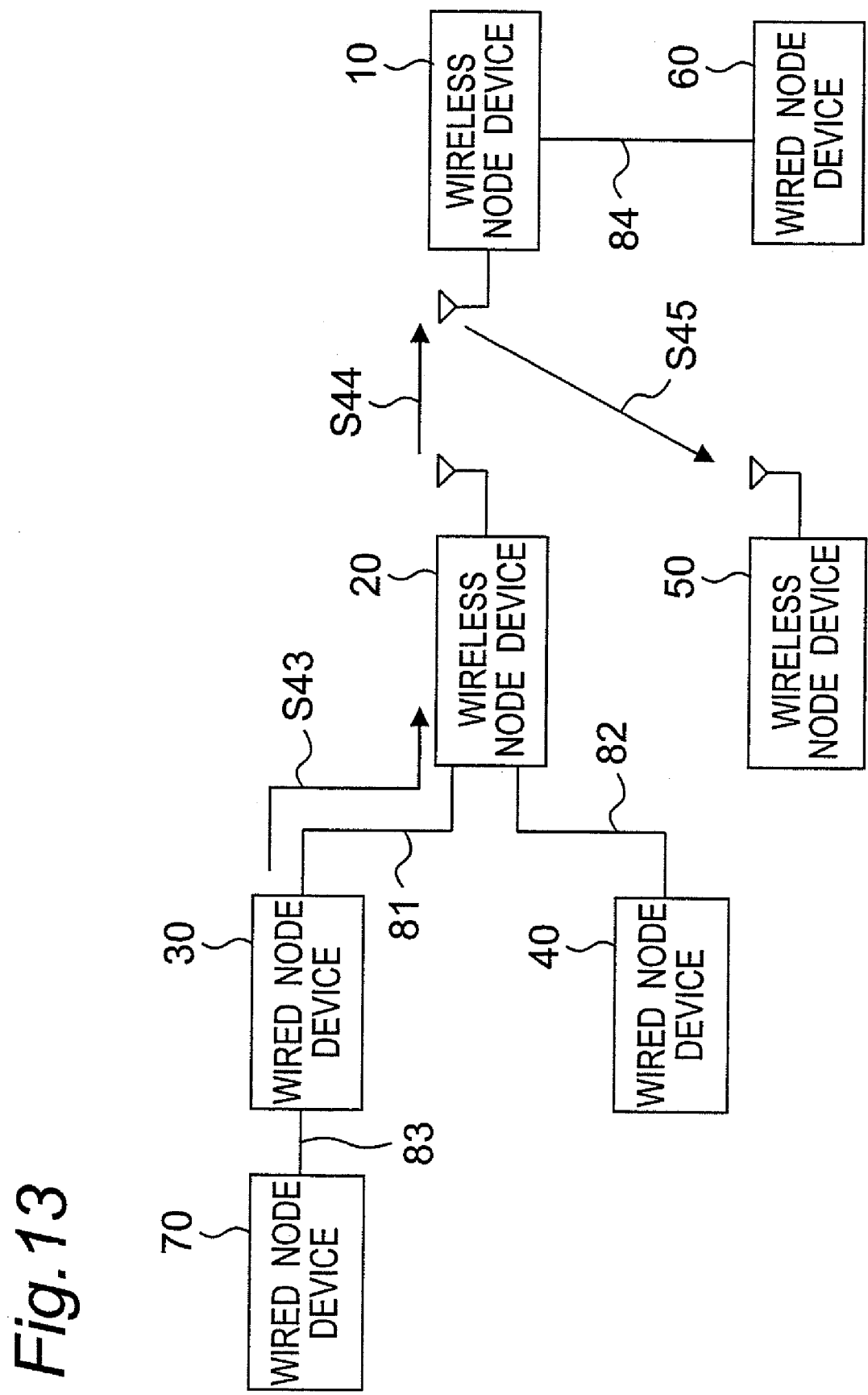
FIG. 13 is a block diagram showing a second part of the exemplary operation of the wireless communication system of FIG. 1.
Figure 14:
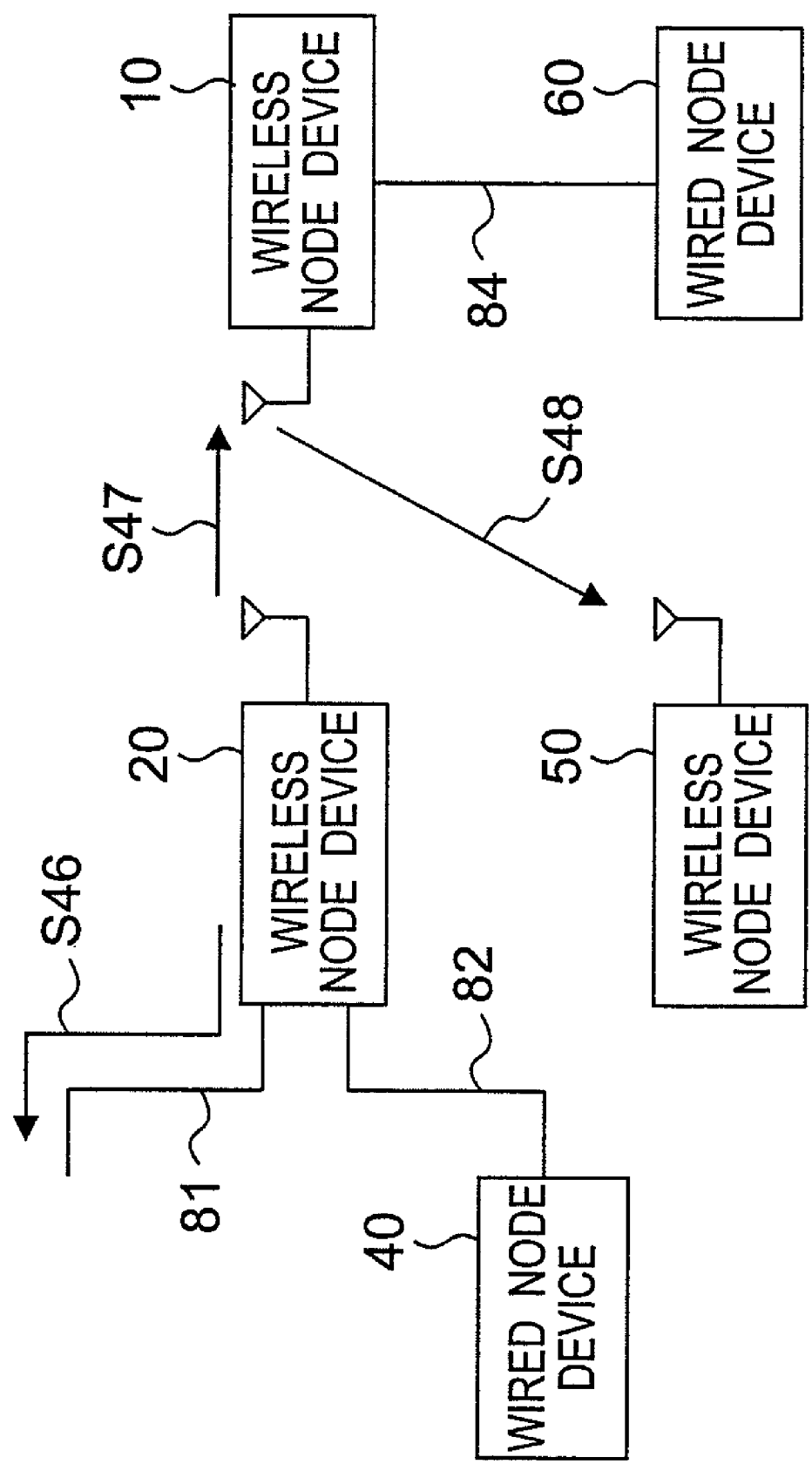
FIG. 14 is a block diagram showing a third part of the exemplary operation of the wireless communication system of FIG. 1.

Thereafter, the wireless node device 20 receives a Report Physical Address message from the wired node device 30 connected by wire (in step S43 of FIG. 13). When receiving the Report Physical Address message, the CEC controller 21A of the wireless node device 20 adds an originating logical address (i.e., the logical address of the wired node device 30) to the address list table in the address list memory 21B. The CEC controller 21A further sets a flag corresponding to the added logical address such that the flag is set to 1, and obtains a wireless address for the wireless node device 30 from the address management controller 11C of the wireless node device 10, and adds the wireless address to the address list table in the address list memory 21B as an identifier. Thus, the CEC controller 21A of the wireless node device 20 transmits, to the wireless node device 10, a list exchange message containing the logical address and the associated identifier of the wired node device 30 and in which the corresponding A-bit is set to 1 (in step S44 of FIG. 13). When the CEC controller 11A of the wireless node device 10 receives the list exchange message from the wireless node device 20, since the A-bit is set to 1, the CEC controller 11A adds the logical address and the associated identifier of the wired node device 30, contained in the list exchange message, to the address list table in the address list memory 11B, and sets a corresponding flag value to 0. Subsequently, the wireless node device 20 performs the same operations with the wired node devices 40 and 70 which are connected by wire to the wireless node device 20, adds information on the wired node devices 40 and 70 to the address list table in the address list memory 21B, and transmits a list exchange message to the wireless node device 10.

Thereafter, the wireless node device 10 starts wireless communication with the wireless node device 50. After establishing a wireless connection, the wireless node device 10 transmits a list exchange message to the wireless node device 50 (in step S45 of FIG. 13). The list exchange message contains the logical addresses and the associated identifiers of the wireless node devices 10 and 20 and the wired node devices 30, 40, 60, and 70, and 1 is set in each corresponding A-bit.

When the wireless node device 50 receives the list exchange message, since the A-bits corresponding to the respective logical addresses are set to 1, the wireless node device 50 adds the logical addresses and the associated identifiers, contained in the list exchange message, to the address list table in the address list memory 51B, and sets corresponding flag values to 0. Thereafter, the CEC controller 51A of the wireless node device 50 determines a logical address of the wireless node device 50 itself. When determining the logical address, the CEC controller 21A of the wireless node device 20 uses a logical address, which is not contained in the address list table in the address list memory 51B, as the logical address of the wireless node device 50 itself. After the CEC controller 51A of the wireless node device 50 determines the logical address of the wireless node device 50 itself, the CEC controller 51A adds the logical address to the address list table in the address list memory 51B. The CEC controller 51A further sets a flag corresponding to the added logical address such that the flag is set to 1, and obtains a wireless address for the wireless node device 50 from the address management controller 11C of the wireless node device 10, and adds the wireless address to the address list table in the address list memory 51B as an identifier. Thereafter, the wireless node device 50 transmits, to the wireless node device 10, a list exchange message containing the logical address and identifier of the wireless node device 50 and in which the corresponding A-bit is set to 1. When the CEC controller 11A of the wireless node device 10 receives the list exchange message from the wireless node device 50, since 1 is set in the A-bit, the CEC controller 11A adds the logical address and the associated identifier of the wireless node device 50, contained in the list exchange message, to the address list table in the address list memory 11B, and sets a corresponding flag value to 0. The wireless node device 50 also transmits the list exchange message to the wireless node device 20, as well as transmitting to the wireless node device 10. The list exchange message may be directly transmitted from the wireless node device 50 to the wireless node device 20, or may be transmitted to the wireless node device 20 by the wireless node device 10.

Each of the wireless node devices 10 and 20 periodically outputs polling messages destined for logical addresses of node devices with a flag value=1 in its own address list table (the wireless node devices 10 and 20 themselves are excluded) (See FIG. 6). Specifically, the wireless node device 10 outputs polling messages to the wired node device 60 with a flag value=1 in the address list table in the address list memory 11B, and the wireless node device 20 outputs polling messages to the wired node devices 30, 40, and 70 with a flag value=1 in the address list table in the address list memory 21B.

Here, as an example, discuss the case in which the wired node device 30 is disconnected from the wireless node device 20. When the wireless node device 20 outputs a polling message to the wired node device 30, no ACK is returned because the wired node device 30 is not present (in step S46 of FIG. 14). Thus, the wireless node device 20 determines that the wired node device 30 has been disconnected, and therefore, deletes the logical address, identifier, and flag corresponding to the wired node device 30 from the address list table in the address list memory 21B. Thereafter, the wireless node device 20 transmits, to the wireless node device 10, a list exchange message containing the logical address and identifier of the wired node device 30 and in which the corresponding D-bit is set to 1 (in step S47 of FIG. 14).

When the CEC controller 11A of the wireless node device 10 receives the list exchange message, since the D-bit is set to 1, the CEC controller 11A deletes an item (an identifier, a logical address, and a flag) for the node device corresponding to the logical address and identifier contained in the list exchange message, from the address list table in the address list memory 11B. The wireless node device 20 also transmits the list exchange message to the wireless node device 50, as well as transmitting to the wireless node device 10. Thus, an item (an identifier, a logical address, and a flag) for the node device corresponding to the logical address and identifier contained in the list exchange message are similarly deleted from the address list table in the address list memory 51B of the wireless node device 50. The list exchange message may be directly transmitted from the wireless node device 20 to the wireless node device 50, or may be transmitted to the wireless node device 50 by the wireless node device 10 (in step S48 of FIG. 14).

In addition, the CEC controller 21A of the wireless node device 20 can also manage physical addresses of the respective node devices in the wireless communication system, and thus, determine that when detecting that the wired node device 30 has been disconnected, the wired node device 70 which is connected in a lower layer than the wired node device 30 has also been disconnected.

In addition, it is possible to determine that when any ACK is not returned for polling messages transmitted a plurality of times, a device has been disconnected. Further, the wireless node devices 10, 20, and 50 may periodically and sequentially output polling messages to all logical addresses.

Second Preferred Embodiment

A second preferred embodiment according to the present invention will be described below. The present embodiment is characterized in that, in addition to the configuration in the first preferred embodiment, a CEC controller 21A of a wireless node device 20 detects disconnection of another node device which has been connected by wire to the wireless node device 20, based on an HDMI 5V signal detected by a wired interface circuit 22. An address list table in an address list memory 21B further contains a physical address field, and a logical address is deleted from the address list table based on a 5V signal and a physical address. Explanations on the same features as those of the first preferred embodiment are omitted.

Figures 15, 16:
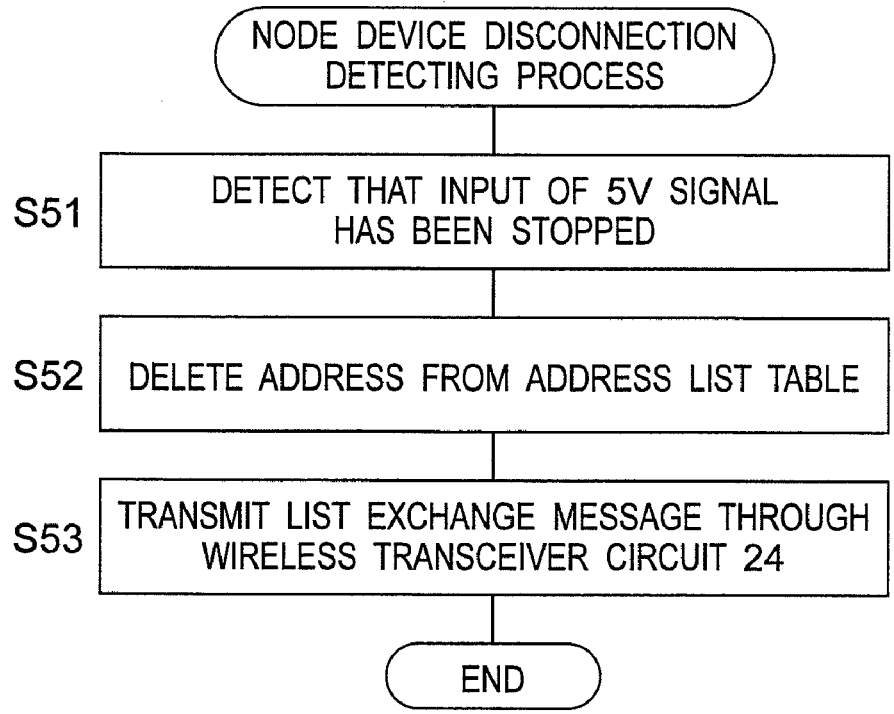
FIG. 15 is a flowchart showing a node device disconnection detecting process performed by the CEC controller 21A of the wireless node device 20 of FIG. 3, according to a second preferred embodiment of the present invention.
FIG. 16 is a diagram showing an exemplary format of an address list table stored in the address list memory 21B of the wireless node device 20 of FIG. 3, according to the second preferred embodiment of the present invention.

FIG. 15 is a flowchart showing a node device disconnection detecting process performed by the CEC controller 21A of the wireless node device 20 of FIG. 3, according to the second preferred embodiment of the present invention. In step S51 of FIG. 15, the CEC controller 21A of the wireless node device 20 detects that an input of a 5V signal at the wired interface circuit 22 from one of node devices connected by wire (Source device) has been stopped. Then, in step S52, the CEC controller 21A deletes from the address list table in the address list memory 21B, an identifier, a logical address, and a flag that are associated with a physical address assigned to a node device connected to an input port of the wired interface circuit 22, to which port the input of the 5V signal has been stopped, as well as the CEC controller 21A deletes the physical address. Similarly, the CEC controller 21A deletes from the address list table in the address list memory 21B, identifiers, logical addresses, and flags that are associated with physical addresses in lower layers than the physical address assigned to the node device connected to the input port, to which the input of the 5V signal has been stopped, as well as the CEC controller 21A deletes the physical address. Then, in step S53, the CEC controller 21A transmits a list exchange message, which reflects a state of the address list table after deletion, to other wireless node devices 10 and 50 through a wireless transceiver circuit 24.

FIG. 16 is a diagram showing an exemplary format of the address list table stored in the address list memory 21B of the wireless node device 20 of FIG. 3, according to the second preferred embodiment of the present invention. Referring to FIG. 16, an identifier field 101, a logical address field 102, and a flag field 103 are the same as those of FIG. 9, and a physical address 104 is an address assigned according to conditions in which a node device is connected.

In the second preferred embodiment, the process of FIG. 5 is modified such that a physical address contained in a Report Physical Address message received in step S1 is further added, in step S3, to the address list table in the address list memory 21B.

MODIFIED PREFERRED EMBODIMENTS

The wireless communication system of the preferred embodiments according to the present invention is not limited to be configured as shown in FIGS. 1 to 4, and may be further provided with other wired node devices and/or wireless node devices. For example, other Source devices may be further connected to the wired interfaces of the wireless node devices 10 and 20, the wired node device 30, etc., and other Source devices may be further connected through the wireless interfaces.

The wireless node devices 10, 20, and 50 may be configured without the video and audio processing circuits 13, 23, and 53, but configured as wireless adapter devices to be connected to existing prior-art wired node devices.

In addition, an address managing process should be performed by any one of a plurality of wireless node devices in a wireless communication system. Therefore, one of the wireless node devices 20 and 50, instead of the wireless node device 10, may include an address management controller. Alternatively, each of the wireless node devices 10, 20, and 50 may include an address management controller, and one of the wireless node devices 10, 20, and 50 may perform an address managing process.

Although exemplary message format and table format are shown in the above-described embodiments, other formats may be used as long as the format provides the same operational effects.

INDUSTRIAL APPLICABILITY

The logical address assignment method and wireless communication device according to the present invention are useful as a wireless communication device for transmitting videos over the air among a plurality of devices, etc.

The invention claimed is:

1. A logical address assignment method for use in a wireless communication system that includes a plurality of node devices including at least two wireless communication devices and each transmitting and receiving CEC messages of HDMI, each of the at least two wireless communication devices comprising a wired interface, a wireless interface, and an address list memory, the logical address assignment method including steps of:

by each of the wireless communication devices, storing logical addresses of node devices connected through the wired interface and logical addresses of node devices connected through the wireless interface, in the address list memory; and by one of the at least two wireless communication devices, determining a destination logical address of a polling message received through the wired interface based on contents of the address list memory when the polling message is received through the wired interface, and transmitting an ACK signal for the received polling message through the wired interface in the case that the destination logical address of the polling message is a logical address of a node device connected through the wireless interface.

2. The logical address assignment method as claimed in claim 1, wherein the step of storing the logical addresses includes steps of, by one of the at least two wireless communication devices:

adding a logical address of a node device newly connected to the wired interface, to the address list memory;

checking periodically connections of the node devices which are connected to the one wireless communication device through the wired interface and whose logical addresses are stored in the address list memory; and deleting a logical address of a node device from the address list memory, where said node device is determined to be disconnected from the one wireless communication device, as a result of checking the connections.

3. The logical address assignment method as claimed in claim 2, wherein the step of checking periodically the connections includes checking the connections by polling messages.

4. The logical address assignment method as claimed in claim 1, wherein each of the address list memory further stores flags each indicating whether or not each of the node devices corresponding to the logical addresses stored in the address list memory is connected through the wired interface to the wireless communication device comprising the address list memory.

5. The logical address assignment method as claimed in claim 4, wherein each of the address list memory further contains physical addresses of the node devices corresponding to the logical addresses stored in the address list memory.

6. The logical address assignment method as claimed in claim 5, wherein the step of storing the logical addresses includes steps of, by one of the at least two wireless communication devices:

referring to the physical addresses in the address list memory when a node device connected through the wired interface has been disconnected, and determining that a lower node device connected in a lower layer than that of the disconnected node device has also been disconnected in the case that there is the lower node device; and deleting from the address list memory, the logical address of each of the node devices which is determined to be disconnected from the one wireless communication device.

7. The logical address assignment method as claimed in claim 1, wherein the wireless communication system further includes an address management controller for managing wireless addresses for the respective node devices, and wherein the step of storing the logical addresses includes a step of obtaining wireless addresses from the address management controller, where each of the wireless addresses is for each of the node devices connected to the wireless communication device through the wired interface, and storing each of the wireless addresses in the address list memory in association with the logical address of the corresponding node device.

8. The logical address assignment method as claimed in claim 1, wherein each of the wired interfaces includes a 5V signal line of HDMI, and wherein the step of storing the logical addresses includes steps of, by one of the at least two wireless communication devices:
determining whether or not a node device has been disconnected from the one wireless communication device based on a voltage value of the 5V signal line, where said node device is connected to the one wireless communication device through the wired interface and whose logical address is stored in the address list memory; and
deleting from the address list memory, the logical address of the node device determined to be disconnected from the one wireless communication device.

9. The logical address assignment method as claimed in claim 1, further including a step of:
by one of the at least two wireless communication devices, receiving a specific message, and adding an originating logical address contained in the received message to the address list memory of the one wireless communication device.

10. The logical address assignment method as claimed in claim 9,
wherein the specific message is a Report Physical Address message.

11. The logical address assignment method as claimed in claim 10, further including a step of:
by one of the at least two wireless communication devices, receiving the Report Physical Address message, and adding an originating logical address and a physical address which are contained in the received message, to the address list memory of the one wireless communication device, such that the originating logical address and the physical address are associated with each other.

12. The logical address assignment method as claimed in claim 1, further including steps of, by one of the at least two wireless communication devices:
transmitting a list exchange message to the other wireless communication device through the wireless interface when the contents stored in the address list memory are changed, where said list exchange message indicates changes in the address list memory; and
adding or deleting a logical address of a node device connected through the wireless interface according to a list exchange message indicating changes in address list memory of the other wireless communication device, when the list exchange message indicating the changes is received from the other wireless communication device.

13. The logical address assignment method as claimed in claim 12,
wherein the list exchange message contains at least a portion of the contents of the address list memory.

14. The logical address assignment method as claimed in claim 13,
wherein each of the wireless communication devices transmits the list exchange message each time the address list memory of the wireless communication device is changed.

15. The logical address assignment method as claimed in claim 13,
wherein the list exchange message contains at least the logical address that is newly added to or deleted from the address list memory, and a bit indicating the addition or deletion of the logical address.

16. The logical address assignment method as claimed in claim 13,
wherein the list exchange message contains information on all the node devices stored in the address list memory.

17. The logical address assignment method as claimed in claim 1, further including a step of selecting a logical address of a wireless communication device itself from among logical addresses not present in the address list memory of the wireless communication device.

18. A wireless communication device for assigning logical addresses for use in a wireless communication system that includes a plurality of node devices including at least two wireless communication devices and each transmitting and receiving CEC messages of HDMI,
wherein each of the wireless communication devices comprises:
a wired interface;
a wireless interface;
an address list memory for storing logical addresses of node devices connected through the wired interface and logical addresses of node devices connected through the wireless interface; and
a controller for controlling transmission and reception through the wired interface and the wireless interface based on contents of the address list memory,
wherein, when receiving a polling message from the wired interface, the controller determines a destination logical address of the polling message based on contents of the address list memory, and transmits an ACK signal for the received polling message through the wired interface in the case that the destination logical address of the polling message is a logical address of a node device connected through the wireless interface.

19. The wireless communication device as claimed in claim 18,
wherein the controller:
adds a logical address of a node device newly connected to the wired interface, to the address list memory;
checks periodically connections of the node devices which are connected to the wireless communication device through the wired interface and whose logical addresses are stored in the address list memory; and
deletes a logical address of a node device from the address list memory, where said node device is determined to be disconnected from the wireless communication device, as a result of checking the connections.

20. The wireless communication device as claimed in claim 19,
wherein checking periodically the connections includes checking the connections by polling messages.

21. The wireless communication device as claimed in claim 18,
wherein each of the address list memory further stores flags each indicating whether or not each of the node devices corresponding to the logical addresses stored in the address list memory is connected through the wired interface to the wireless communication device comprising the address list memory.

22. The wireless communication device as claimed in claim 21,
wherein each of the address list memory further contains physical addresses of the node devices corresponding to the logical addresses stored in the address list memory.

23. The wireless communication device as claimed in claim 22,
wherein the controller:
refers to the physical addresses in the address list memory when a node device connected through the wired interface has been disconnected, and determines that a lower node device connected in a lower layer than that of the disconnected node device has also been disconnected in the case that there is the lower node device; and deletes from the address list memory, the logical address of each of the node devices which is determined to be disconnected from the wireless communication device.

24. The wireless communication device as claimed in claim 18, wherein the wireless communication system further includes an address management controller for managing wireless addresses for the respective node devices, and wherein the controller obtains wireless addresses from the address management controller, where each of the wireless addresses is for each of the node devices connected to the wireless communication device through the wired interface, and stores each of the wireless addresses in the address list memory in association with the logical address of the corresponding node device.

25. The wireless communication device as claimed in claim 18, wherein the wired interface includes a 5V signal line of HDMI, and wherein the controller:

determines whether or not a node device has been disconnected from the wireless communication device based on a voltage value of the 5V signal line, where said node device is connected to the wireless communication device through the wired interface and whose logical address is stored in the address list memory; and deletes from the address list memory, the logical address of the node device determined to be disconnected from the wireless communication device.

26. The wireless communication device as claimed in claim 18, when the wireless communication device receives a specific message, the controller adds an originating logical address contained in the received message to the address list memory.

27. The wireless communication device as claimed in claim 26, wherein the specific message is a Report Physical Address message.

28. The wireless communication device as claimed in claim 27, wherein when the wireless communication device receives the Report Physical Address message, the controller adds an originating logical address and a physical address which are contained in the received message, to the address list memory, such that the originating logical address and the physical address are associated with each other.

29. The wireless communication device as claimed in claim 18, wherein in one of the at least two wireless communication devices:

when the contents stored in the address list memory are changed, the controller transmits a list exchange message to the other wireless communication device through the wireless interface, the list exchange message indicating changes in the address list memory; and when a list exchange message indicating changes in address list memory of the other wireless communication device is received from the other wireless communication device, the controller adds or deletes a logical address of a node device connected through the wireless interface according to the changes indicated in the received list exchange message.

30. The wireless communication device as claimed in claim 29, wherein the list exchange message contains at least a portion of the contents of the address list memory.

31. The wireless communication device as claimed in claim 30, wherein the wireless communication device transmits the list exchange message each time the address list memory is changed.

32. The wireless communication device as claimed in claim 30, wherein the list exchange message contains at least the logical address that is newly added to or deleted from the address list memory, and a bit indicating the addition or deletion of the logical address.

33. The wireless communication device as claimed in claim 30, wherein the list exchange message contains information on all the node devices stored in the address list memory.

34. The wireless communication device as claimed in claim 18, wherein , the controller selects a logical address of the wireless communication device itself from among logical addresses not present in the address list memory.

* * * * *